United States Patent
Terauchi et al.

(10) Patent No.: US 11,901,582 B2
(45) Date of Patent: Feb. 13, 2024

(54) POWER SUPPLY DEVICE, VEHICLE EQUIPPED WITH POWER SUPPLY DEVICE, AND POWER STORAGE DEVICE

(71) Applicants: Panasonic Corporation, Kadoma (JP); SANYO Electric Co., Ltd., Daito (JP)

(72) Inventors: Shinobu Terauchi, Hyogo (JP); Tetsuji Omura, Hyogo (JP)

(73) Assignees: PANASONIC HOLDINGS CORPORATION, Kadoma (JP); SANYO Electric Co., Ltd., Osaka (JP)

( * ) Notice: Subject to any disclaimer, the term of this patent is extended or adjusted under 35 U.S.C. 154(b) by 717 days.

(21) Appl. No.: 16/954,759

(22) PCT Filed: Nov. 26, 2018

(86) PCT No.: PCT/JP2018/043385
§ 371 (c)(1),
(2) Date: Jun. 17, 2020

(87) PCT Pub. No.: WO2019/130936
PCT Pub. Date: Jul. 4, 2019

(65) Prior Publication Data
US 2021/0091349 A1 Mar. 25, 2021

(30) Foreign Application Priority Data
Dec. 25, 2017 (JP) .................. 2017-248345

(51) Int. Cl.
*H01M 50/224* (2021.01)
*H01M 50/264* (2021.01)
(Continued)

(52) U.S. Cl.
CPC ......... *H01M 50/502* (2021.01); *H01M 10/46* (2013.01); *H01M 50/209* (2021.01);
(Continued)

(58) Field of Classification Search
CPC .................. H01M 2220/20; H01M 50/264
See application file for complete search history.

(56) References Cited

U.S. PATENT DOCUMENTS

2014/0232302 A1* 8/2014 Tsushima ............ H01M 10/441
318/139
2015/0125720 A1 5/2015 Fujii et al.
(Continued)

FOREIGN PATENT DOCUMENTS

JP 2007-141637 A 6/2007
JP 2008-078071 A 4/2008
(Continued)

OTHER PUBLICATIONS

Extended (Supplementary) European Search Report dated Mar. 12, 2021, issued in counterpart EP application No. 18893779.1. (9 pages).

(Continued)

*Primary Examiner* — Maria Laios
*Assistant Examiner* — Jordan E Berresford
(74) *Attorney, Agent, or Firm* — WHDA, LLP

(57) ABSTRACT

A power supply device disposes an end plate at each end of a battery stack in a stacked direction of the battery stack, and couples a binding bar to the end plate, so as to fix battery cells. The binding bar includes a plate-shaped bar that extends in the stacked direction of the battery stack, and an engagement block that is fixed to the plate-shaped bar and protrudes as a face opposing an outer peripheral face of the end plate. The End plate includes a fitting part to which the engagement block is guided, and a stopper. The fitting part is disposed on the outer peripheral face of the end plate. The stopper is disposed closer to the battery stack with respect to the fitting part, and abuts the engagement block.

16 Claims, 19 Drawing Sheets

(51) Int. Cl.
*H01M 50/502* (2021.01)
*H01M 10/46* (2006.01)
*H01M 50/209* (2021.01)

(52) U.S. Cl.
CPC ....... *H01M 50/224* (2021.01); *H01M 50/264* (2021.01); *H01M 2220/20* (2013.01)

(56) References Cited

U.S. PATENT DOCUMENTS

2015/0333305 A1   11/2015  Seki et al.
2016/0260946 A1    9/2016  Ochi et al.
2017/0352850 A1* 12/2017  Nagane ............... H01M 50/236

FOREIGN PATENT DOCUMENTS

| JP | 2012181970 A | * | 9/2012 |
| JP | 2015-220117 A | | 12/2015 |
| JP | 2019091555 A | * | 6/2019 |
| WO | 2013/146561 A1 | | 10/2013 |
| WO | 2015/145927 A1 | | 10/2015 |

OTHER PUBLICATIONS

International Search Report dated Jan. 22, 2019, issued in counterpart application No. PCT/JP2018/043385, with English translation. (4 pages).

\* cited by examiner

POWER SUPPLY DEVICE, VEHICLE EQUIPPED WITH POWER SUPPLY DEVICE, AND POWER STORAGE DEVICE

TECHNICAL FIELD

The present invention relates to a power supply device, a vehicle equipped with the power supply device, and a power storage device equipped with the power supply device. The power supply device includes a battery stack that has a plurality of battery cells stacked together, and an end plate that holds the battery stack at each end of the battery stack.

BACKGROUND ART

A typical power supply device includes a battery stack formed of a plurality of rectangular battery cells, a pair of end plates, and binding bars. The pair of end plates are disposed at both ends of the battery stack, and the binding bars are configured to couple the pair of end plates together (see PTL 1). In this power supply device, the battery stack formed of the plurality of rectangular battery cells is bound by the end plates and the binding bars, so that the battery stack is assembled.

CITATION LIST

Patent Literature

PTL 1: Unexamined Japanese Patent Publication No. 2015-220117

SUMMARY OF THE INVENTION

Technical Problem

In the power supply device disclosed in PTL 1, the battery stack formed of the plurality of rectangular battery cells is assembled by the end plates and the binding bars, so that the plurality of rectangular battery cells forming the battery stack are less prone to expand. In other words, the expansion of the rectangular battery cells is suppressed by the binding bars and the end plates, resulting in large force applied to the binding bars and the end plates.

On the other hand, when each rectangular battery cell increases energy density per volume or energy density per weight, a dimensional variation of the rectangular battery cell is prone to increase in response to its charging/discharging or degradation. The rectangular battery cell has an amount of expansion that results in a load applied to the binding bars and the end plates. Thus, in the configuration of the power supply device disclosed in PTL 1, when using a rectangular battery cell exhibiting a large dimensional variation in response to the amount of expansion, a large load is applied to the end plates and/or the binding bars, resulting in deformation or damage of the end plates and/or the binding bars.

The present invention has been devised in view of the respects described above, and a main object of the present invention is to provide a technique to prevent the end plates and the binding bars from being deformed or damaged while having the plurality of battery cells assembled together by the end plates and the binding bars.

Solution to Problem

A power supply device according to an aspect of the present invention includes a battery stack having a plurality of battery cells stacked together, a pair of end plates, and binding bars. Each of the pair of end plates is disposed at an end of the battery stack in a stacked direction of the battery stack. Each of the binding bars has its both ends coupled to the pair of end plates. Each of the binding bars includes a plate-shaped bar and engagement blocks. The plate-shaped bar extends in the stacked direction of the battery stack. Each of the engagement blocks is fixed to the plate-shaped bar and protrudes as a face opposing an outer peripheral face of the corresponding end plate. Each of the end plates includes fitting parts and stoppers. Each of the fitting parts is disposed on the outer peripheral face of the end plate and configured to guide the corresponding engagement block. Each of the stoppers is disposed closer to the battery stack with respect to the fitting part and is configured to abut the corresponding engagement block.

Further, an electric vehicle equipped with the power supply device (including configuration elements according to the aspect above) includes: the power supply device; a motor for driving, the motor to which the power supply device supplies power; a vehicle body on which the power supply device and the motor are mounted; and wheels configured to be operated by the motor to drive the vehicle body.

Further, a power storage device equipped with the power supply device (including the configuration elements according to the aspect above) includes the power supply device, and a power supply controller configured to control charging to and discharging from the power supply device. The power supply controller is configured to allow the battery cells to be charged by power from an externally connected device and is configured to control charging to the battery cells.

Advantageous Effect of Invention

The present invention provides a power supply device that has, a simple configuration but prevents an end plate and/or a binding bar from being deformed or damaged even when a relatively large load is applied to the end plate and/or the binding bar. The reason is that the power supply device has the configurations below: the binding bar includes a plate-shaped bar and an engagement block to be fixed to the plate-shaped bar, and the engagement block protrudes as a face opposing an outer peripheral face of the end plate; the end plate includes a fitting part configured to guide the engagement block, and a stopper that is disposed closer to a battery stack with respect to the fitting part and configured to abut the engagement block; and when the engagement block of the binding bar is guided to the fitting part, the stopper prevents the engagement block from moving out of position in response to tensile force applied to the binding bar. In the configuration where the binding bar is coupled to the end plate, the binding bar is firmly fixed to the end plate by means of the engagement block, the fitting part, and the stopper, unlike a conventional binding bar where the bent region is deformed by bending stress.

DESCRIPTION OF EMBODIMENT

First, a focus point of the present invention will be described. A power supply device having a plurality of battery cells stacked together includes a battery stack formed of the plurality of battery cells, end plates, and binding bars. Each of the end plates is disposed at an end of the battery stack, and each of the binding bars is configured to couple the end plates together, so that the plurality cells are bound. The plurality of battery cells are bound together with the end plates and the binding bars, both having high rigidity. With this configuration, the battery cells are less prone to have a fault in response to the charging/discharging or degradation, the fault such as an expansion, a deformation, a relative movement, or oscillation. As a result, malfunctions caused by the battery cells are less prone to occur. In the power supply device described above, each of the battery cells has a stacked surface with an area of approximately 100 square centimeters. In the configuration where the expansion of the battery cells is suppressed, strong force more than 1 ton may be applied to the end plates. The end plates are fixed to the binding bars, and thus, considerably strong tensile force is applied through the end plates to the binding bars.

Figure 19:
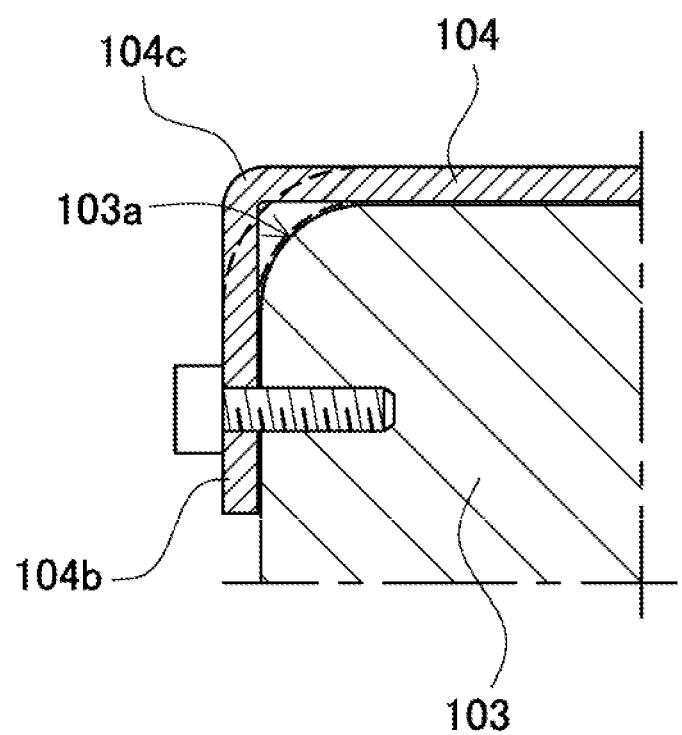
FIG. 19 is an enlarged sectional view of a bending part of a binding bar included in a conventional power supply device.

In a conventional power supply device having the ends of the battery stack fixed by the end plates, each of the binding bars has its both ends bent inward at 90 degrees to form bent regions, and has each of the bent regions fixed to an outer side face of the corresponding end plate. In this configuration, the ends of the binding bar as a metal sheet are bent to form the bent regions, and each of the bent regions is fixed to the outer face of the corresponding end plate. Thus, each of the bent regions is formed of a metal sheet having a same thickness as that of the binding bar. The binding bar employs a metal sheet that exhibits tensile strength to endure the tensile force generated by the expansion of the battery stack. The binding bar employs, for example, a metal sheet having a thickness of approximately 1 mm to 2 mm, so as to endure the tensile force. The binding bar has each of the bent regions fixed to the outer face of the corresponding end plate. Here, in reaction to force pressing the battery stack, the tensile stress is applied to an area of the binding bar, the area extending in the stacked direction of the battery stack. Concurrently, bending stress is applied to the bent regions of the binding bar. As illustrated with a chain line in FIG. 19, the bending stress deforms bending part 104c of bent region 104b such that a space at a corner of end plate 103 is filled. Even a binding bar that hardly stretches under the tensile stress is prone to be deformed under the bending stress. When bent region 104b is deformed as illustrated with the chain line in FIG. 19, binding bar 104 may be broken beyond its endurance limit.

As has been described above, when the tensile force applied to the binding bar is increased, great local stress is further concentrated on an area between an inner side of the bending part of the binding bar and the corner of end plate, resulting in deformation or damage of the binding bar and/or the end plate. In view of the respects described above, it is important to optimize the binding bar and the end plate and to study a configuration to keep the stress applied to each of the binding bar and the end plate within the endurance limit.

A power supply device according to an aspect of the present invention may be specified in a configuration below. The power supply device includes battery stack 2 having a plurality of battery cells 1 stacked together, a pair of end plates 3, and binding bars 4. Each of the pair of end plates 3 is disposed at an end of battery stack 2 in a stacked direction of the battery stack 2. Each of binding bars 4 has its both ends coupled to the pair of end plates 3. Each binding bar 4 includes plate-shaped bar 6 and engagement blocks 5. Plate-shaped bar 6 extends in the stacked direction of battery stack 2, and each engagement block 5 is fixed to plate-shaped bar 6 and protrudes as a face opposing an outer peripheral face of end plate 3. Each end plate 3 includes fitting parts 3a and stoppers 3b. Each fitting part 3a is disposed on the outer peripheral face of end plate 3 and configured to guide engagement block 5. Each stopper 3b is disposed closer to battery stack 2 with respect to fitting part 3a and configured to abut engagement block 5.

With the configuration above, each of the engagement blocks of the binding bar is guided to the corresponding fitting part of the end plate, and the corresponding stopper of the end plate prevents the engagement block from moving out of position. Accordingly, the binding bar and the end plate are less prone to be deformed by the strong tensile force applied to the binding bar. Expansion force of the battery cells pushes the end plate, causing the tensile force to be applied through the stopper to the binding bar. With a conventional power supply device, the tensile force applied to the binding bar may affect a bending part of a bent region as the bending stress, causing the binding bar to be deformed. When the binding bar is deformed as a result of the bending stress, as illustrated with the chain line in FIG. 19, an inner side face of bending part 104c is brought into contact with corner 103a of end plate 103 without clearance, so that binding bar 104 has a substantially extended shape. In this state, the binding bar may be broken beyond its endurance limit.

In view of such a problem, with the power supply device described above, each of the engagement blocks of the binding bar is guided to the corresponding fitting part of the end plate, and the stopper prevents the engagement block guided to here from moving out of position. With this configuration, even when having a clearance between the engagement block and the end plate, the binding bar fixed to the end plate is not required to resist the bending stress applied to the bent region (that is, a conventional configuration). In the configuration where the engagement block is guided to the fitting part and disposed in a fixed position by the stopper, the binding bar resists shear stress. The binding bar has strength against shear stress considerably greater than strength against bending stress. Accordingly, the binding bar holds the battery cells without going beyond its endurance limit against the tensile force applied.

Binding bar 4 may also have, at its each end, fixed region 20 to be fixed to a face of end plate 3. With this configuration, the binding bar does not come off the end plate. The binding bar is securely fixed to the end plate with the fixed region at each end of the binding bar.

Fixed region 20 may be bent region 6b of plate-shaped bar 6. With regard to fixed region 20, U-shaped curved part 6c may be formed at a corner of bent region 6b of plate-shaped bar 6 to form unpressed clearance 19 between fixed region 20 and end plate 3.

Further, fixed region 20 and engagement block 5 may be integrally formed, and an end of engagement block 5 may be bent to form fixed region 20. Fixed region 20 as integrally formed with engagement block 5 may have, at its corner, U-shaped curved part 5c to form unpressed clearance 19 between fixed region 20 and end plate 3.

Fixed region 20 may be fixed to an outer face of end plate 3 with bolt 8. Further, the power supply device may have unpressed clearance 19 between an inner side of the corner of fixed region 20 and end plate 3. End plate 3 may have cutout 3e at a corner of end plate 3, the corner opposing the inner side of the corner of fixed region 20, to form unpressed clearance 19 between end plate 3 and binding bar 4.

Further, fixed region 20 may have a shape narrowing in substantial width toward a fixed part at a tip end of fixed region 20, the fixed part to be fixed to end plate 3.

Engagement block 5 may be fixed to plate-shaped bar 6 in a welded configuration. Plate-shaped bar 6 and engagement block 5 are preferably made of any one of iron, an iron alloy, stainless steel (SUS), aluminum, and an aluminum alloy.

Engagement block 5 preferably has thickness (t) of more than or equal to 1 mm Additionally, engagement block 5 has width (K) in the stacked direction of the battery cells, and width (K) is preferably more than or equal to 3 mm. Stopper 3b also has width (h) in the stacked direction of the battery cells, and width (h) is preferably more than or equal to 3 mm.

An exemplary embodiment of the present invention will be described below with reference to the drawings. It is to be understood that the exemplary embodiment below is merely for purpose of embodying a technical concept of the present invention and does not limit the present invention accordingly. Further, in this description, members indicated in the claims are in no way limited to members described in the exemplary embodiment. More specifically, in absence of specific description, a feature of each component described in the exemplary embodiment, such as a dimension, a material, a shape, or a relative position, is simply for purpose of illustrative example and is in no way intended to limit the scope of the present invention. It should be noted that a size, spatial relation, or the like of each of the members illustrated in the drawings may be exaggerated for purpose of clear description. In descriptions below, same names and reference signs represent identical or equivalent members, and a detailed description thereof will be omitted as appropriate. Further, with regard to each constituent element of the present invention, a plurality of constituent elements may be a same member, in other words, a single member may serve as the plurality of constituent elements. Alternatively, functions of a single member may be divided among a plurality of members. Additionally, part of contents described in the exemplary embodiment and an example may be applied in other exemplary embodiments and examples.

First Exemplary Embodiment

Figure 1:
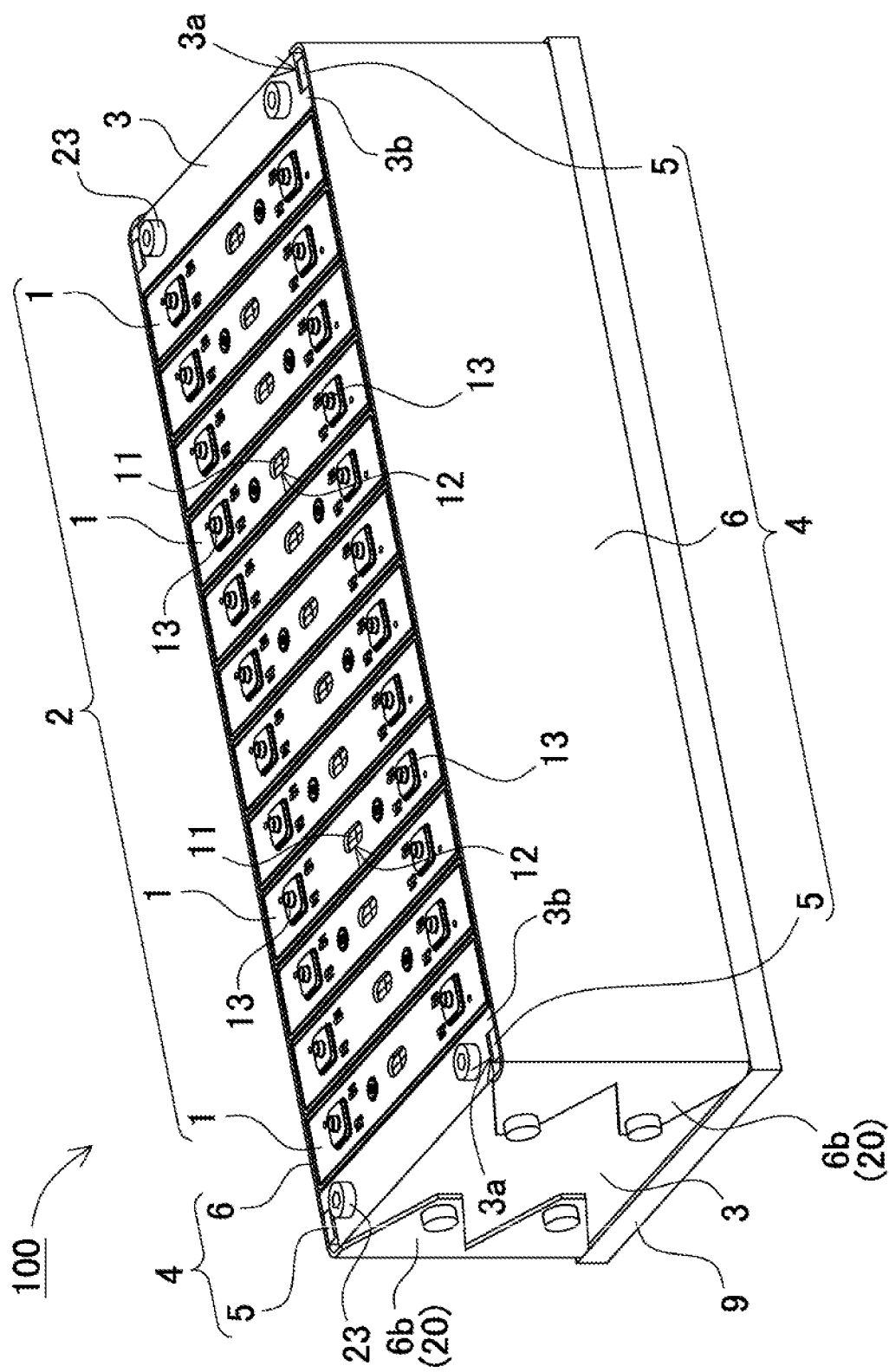
FIG. 1 is a perspective view of a power supply device according to an exemplary embodiment of the present invention.
Figure 2:
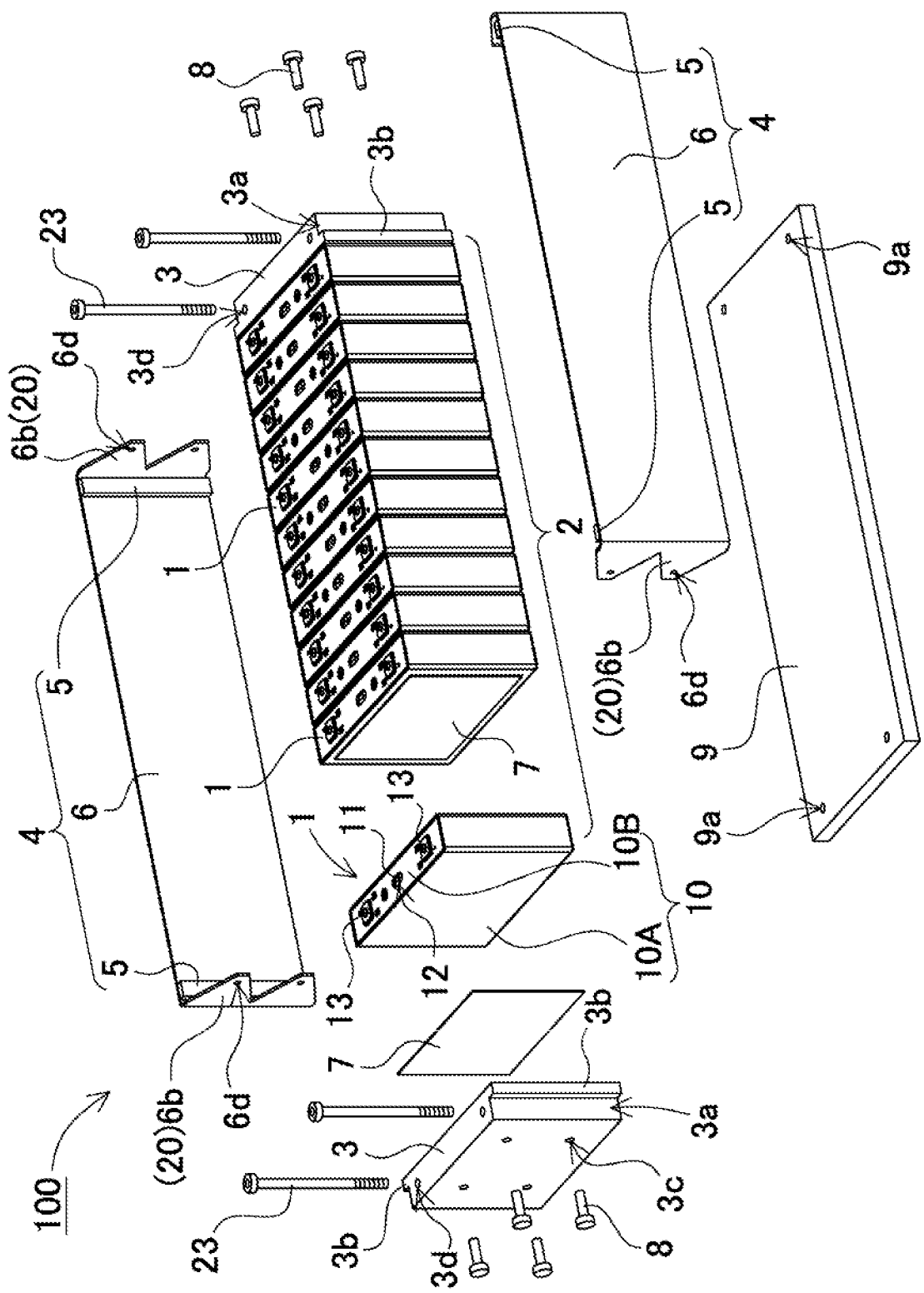
FIG. 2 is an exploded perspective view of the power supply device illustrated in FIG. 1.
Figure 3:
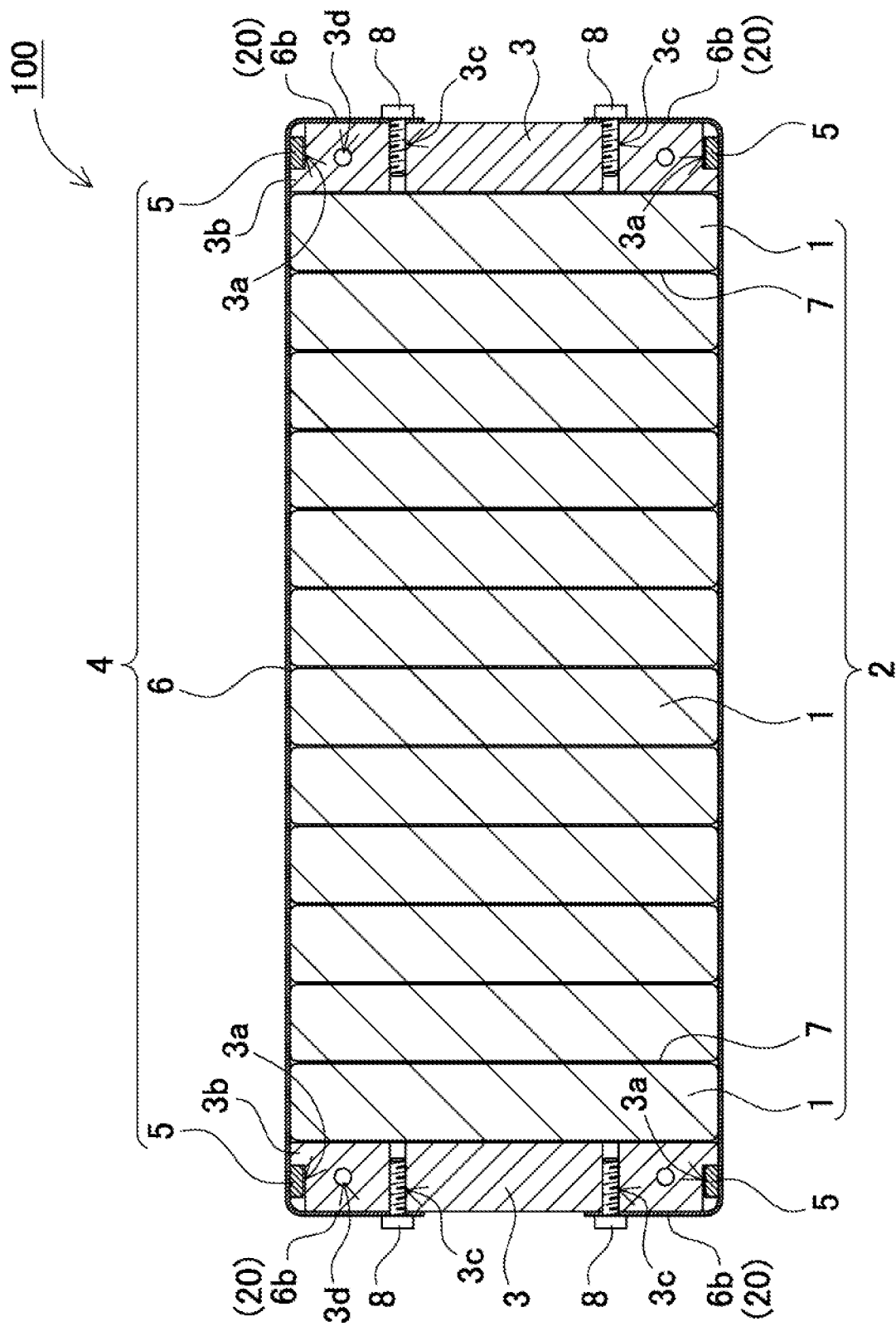
FIG. 3 is a horizontal sectional view of the power supply device illustrated in FIG. 1.

Power supply device 100 illustrated in FIGS. 1 to 3 includes battery stack 2 having a plurality of battery cells 1 stacked together, a pair of end plates 3, and binding bars 4. Each of the pair of end plates 3 is disposed at an end of battery stack 2 in a stacked direction of the battery stack 2. Each of binding bars 4 has its both ends coupled to the pair of end plates 3 such that the plurality of battery cells 1 are held in the stacked direction.

(Battery Cell 1)

As illustrated in FIG. 2, each battery cell 1 is a rectangular box-shaped battery and is greater in width than in thickness. In other words, battery cell 1 is thinner than its width and is stacked in the thickness direction to form battery stack 2. Battery cell 1 is a nonaqueous electrolyte battery in battery case 10 made of metal. Battery cell 1 as the nonaqueous electrolyte battery is a lithium ion secondary battery. Note that, other secondary batteries, such as a nickel hydride battery or a nickel cadmium battery, may be employed for a battery cell. Battery cell 1 here is a rectangular-shaped battery, having two large-width surfaces. Each battery cell 1 is stacked such that the two large-width surfaces oppose each other, and battery stack 2 is formed.

Battery cell 1 includes battery case 10 that is made of metal and formed in a rectangular box shape. Battery case 10 accommodates an electrode assembly (not illustrated) and is filled with electrolyte solution. Battery case 10 as a metal case may be manufactured from aluminum or an aluminum alloy. Battery case 10 includes exterior can 10A and sealing plate 10B. Exterior can 10A is formed of a metal sheet pressed into a bottom-end cylindrical shape, and sealing plate 10B air-tightly seals an opening of exterior can 10A. Sealing plate 10B is a planar metal sheet, and has an outer shape identical to a shape of the opening of exterior can 10A. Sealing plate 10B is laser-welded to be fixed to an outer peripheral edge of exterior can 10A, so as to air-tightly seal the opening of exterior can 10A. Sealing plate 10B fixed to exterior can 10A has, at its both ends, electrode terminals 13 (positive and negative) fixed. Sealing plate 10B also has gas exhaust port 12 provided at a center between electrode terminals 13 (positive and negative). At an inner side of gas exhaust port 12, exhaust valve 11 is provided and configured to open at predetermined internal pressure. Battery stack 2 in FIG. 2 has the plurality of battery cells 1 stacked in an orientation where each face provided with exhaust valve 11 is positioned in a substantially same plane. In each battery cell 1, exhaust valve 11 is arranged in the same plane. Battery stack 2 here has the plurality of battery cells 1 stacked in an orientation where each sealing plate 10B provided with exhaust valve 11 is positioned as an upper face.

The plurality of battery cells 1 stacked to each other are connected in series and/or in parallel via electrode terminals 13 (positive and negative). Power supply device 100 connects electrode terminals 13 (positive and negative) of each adjacent two of battery cells 1 in series and/or in parallel via bus bars (not illustrated). A power supply device connects each adjacent two of the battery cells in series in order to increase an output voltage and thus increase the output. The power supply device connects the adjacent two of the battery cells in parallel in order to increase charging/discharging current.

(Battery Stack 2)

In FIGS. 2 and 3, battery stack 2 has the plurality of battery cells 1 stacked with spacer 7 interposed between battery cells 1, and has battery cells 1 connected in series. Battery stack 2 here has each adjacent two of battery cells 1 arranged in an opposite direction, and has electrode terminals 13 at each side of the adjacent two of battery cells 1 connected via the bus bars. With this configuration, each adjacent two of battery cells 1 are connected in series, so that all of battery cells 1 are connected in series. However, a number and the connected state of the battery cells in the battery stack does not limit the present invention.

As illustrated in FIGS. 2 and 3, battery stack 2 has spacer 7 sandwiched between battery cells 1 stacked. Spacer 7 insulates battery cells 1 adjacent to each other. Spacer 7 here is an insulating plate of plastic formed in a plate shape. Specifically, spacer 7 is formed of a plastic material having a low thermal conductivity, and effectively prevents thermal runaway of battery cells 1 adjacent to spacer 7. Spacer 7 has a shape, to which each battery cell 1 is fitted to be arranged in a fixed position. Thus, battery cells 1 adjacent to each spacer 7 are stacked without being out of position.

As has been described above, each of battery cells 1, stacked and insulated by spacer 7, may have an exterior can made of metal such as aluminum. However, the battery stack is not necessarily required to have a spacer between the battery cells. For example, the exterior can of the battery cell may be formed of an insulating material. Alternatively, an outer periphery of the exterior can of the battery cell may be coated with an insulating sheet, insulating paint, or the like. In these methods, the battery cells adjacent to each other are insulated, and the spacer is thus not required. Further, with the battery stack having no spacer interposed between the battery cells, it is possible to employ a system to cool the battery cells directly by using refrigerant or the like, instead of employing an air-cooling system to cool the battery cells by forcibly flowing cooling air between the battery cells.

(End Plate 3)

End plates 3 are respectively coupled to binding bars 4 and sandwich battery stack 2 at both end faces of battery stack 2, so that battery cells 1 are fixed in the stacked direction. Each end plate 3 has an outer shape approximately equivalent to or slightly larger than an outer shape of battery cell 1. End plate 3 is a rectangular-shaped plate material, and has an outer peripheral face of its each end fixed to each of binding bars 4, so as to suppress expansion of battery stack 2. End plate 3 is overall made of metal such as aluminum, an aluminum alloy, stainless steel (SUS), or iron. While not illustrated, an end plate may be a metal sheet laminated on plastics. Alternatively, the end plate may be a fiber-reinforced resin molded plate in which reinforcing fibers are overall embedded.

Each end plate 3 is in surface contact with battery cell 1 directly or with a spacer interposed between end plate 3 and battery cell 1 in order to hold battery cells 1. In a process of assembling power supply device 100, end plates 3 are disposed at both ends of battery stack 2. Subsequently, end plates 3 are pressed by a press machine (not illustrated) at the both ends of battery stack 2 such that battery cells 1 are pressed to be held in the stacked direction. In this state, binding bars 4 are fixed to end plates 3. When end plates 3 have been fixed to binding bars 4, the press machine stops pressing end plates 3.

End plates 3 are fixed to binding bars 4 to absorb expansion force of battery stack 2 and hold battery cells 1. Each end plate 3 includes, on the outer peripheral faces of its both ends, fitting parts 3*a*. Each binding bar 4, to which end plate 3 is to be fixed, includes engagement blocks 5. Fitting parts 3*a* are respectively configured to guide engagement blocks 5 of binding bar 4 such that end plate 3 is reliably coupled to binding bar 4. Further, each end plate 3 includes stoppers 3*b* provided closer to battery stack 2 with respect to fitting parts 3*a*. Stoppers 3*b* abut engagement blocks 5. In other words, each end plate 3 includes stoppers 3*b* on its both side faces, and stoppers 3*b* respectively protrude from the ends of end plate 3 (placed closer to battery stack 2 with respect to fitting parts 3*a*) toward binding bars 4. With stoppers 3*b* in contact with engagement blocks 5, end plate 3 is configured to use tensile force applied to binding bar 4, so as to endure the expansion force of battery cells 1 and hold battery cells 1. The tensile force applied to binding bar 4 affects an area where each stopper 3*b* is in contact with engagement block 5. Accordingly, each stopper 3*b* has a width sufficient not to be deformed by the tensile force. Width (h) of stopper 3*b* is set to be an optimal value in view of the tensile force applied to binding bar 4. For example, when end plate 3 is overall made of aluminum, width (h) of stopper 3*b* is more than or equal to 3 mm, preferably more than or equal to 4 mm, more preferably more than or equal to 5 mm, and optimally more than or equal to 8 mm.

Figure 4:
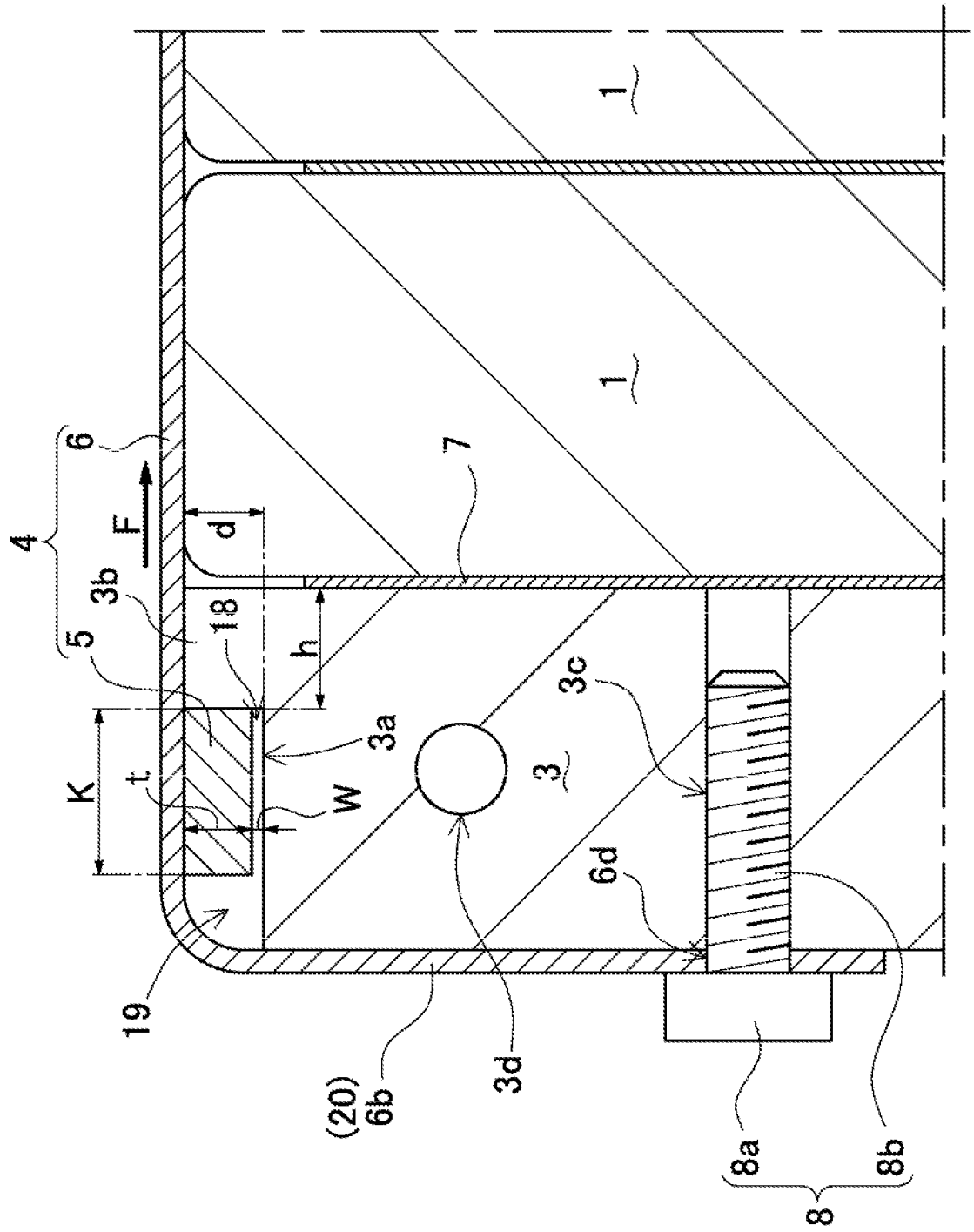
FIG. 4 is an enlarged sectional view of main part of the power supply device illustrated in FIG. 3.

FIG. 4 is a schematic enlarged sectional view of an area where engagement block 5 is guided to fitting part 3*a*. End plate 3 here has clearance 18 inside a corner between fitting part 3*a* and stopper 3*b*. With clearance 18 provided here, end plate 3 has width (h) of stopper 3*b* far greater than width (W) of clearance 18, for example, greater than 10 times width (W). Stopper 3*b*, having width (h) far greater than width (W) of clearance 18, resists the tensile force applied to binding bar 4 as shear stress, not as bending stress. Maximum shear force that materials endure is considerably stronger than maximum bending force, and width (h) of stopper 3*b* is designed to be greater than width (W) of clearance 18. This configuration reliably prevents stopper 3*b* from being deformed. Accordingly, with clearance 18 provided at the inner side of the corner between fitting part 3*a* and stopper 3*b*, end plate 3 has width (h) of stopper 3*b* greater than 10 times width (W) of clearance 18, so as to resist the tensile force applied to binding bar 4 as the shear stress onto stopper 3*b*.

Further, height (d) of stopper 3*b* is preferably greater than thickness (t) of engagement block 5 such that a clearance between a tip end face of stopper 3*b* and an inner face of binding bar 4 is reduced. Alternatively, height (d) of stopper 3*b* may be smaller than thickness (t) of the engagement block such that a clearance is provided between the tip end face of stopper 3*b* and the inner face of binding bar 4. Accordingly, height (d) of stopper 3*b* is specified in view of thickness (t) of engagement block 5, a dimension of the clearance between the tip end face of stopper 3*b* and the inner face of binding bar 4, and width (W) of clearance 18 inside the corner between fitting part 3*a* and stopper 3*b*. Height (d) of stopper 3*b* may be, for example, (t−1) to (t+1) mm with respect to thickness (t [mm]) of engagement block 5.

(Binding Bar 4)

Each binding bar 4 includes plate-shaped bar 6 and engagement blocks 5. Plate-shaped bar 6 extends in the stacked direction of battery stack 2, and each engagement block 5 is fixed to plate-shaped bar 6 and protrudes as a face opposing the outer peripheral face of end plate 3. Binding bar 4 also has, at its both ends, fixed regions (=boards) 20 to be fixed to end plate 3. Plate-shaped bar 6 is disposed opposite battery stack 2. Each engagement block 5 is guided to fitting part 3a of end plate 3, and each fixed region 20 is fixed to an outer face of end plate 3.

(Plate-Shaped Bar 6)

Plate-shaped bar 6 is a metal sheet configured to endure strong tensile force. Plate-shaped bar 6 is, for example, a metal sheet such as a high tensile steel sheet exhibiting strength against tensile force of more than or equal to 400 MPa. Plate-shaped bar 6 as the high tensile steel sheet has a thickness of, for example, 1 mm to 2 mm and exhibits strength against the tensile force applied to binding bar 4. In FIG. 2, each binding bar 4 employs, as plate-shaped bar 6 disposed at each side of battery stack 2, a metal sheet having its upper edge (along a width of the metal sheet) disposed above battery stack 2 and its lower edge (along the width) disposed below battery stack 2. In power supply device 100 here, plate-shaped bar 6 as a single metal sheet is disposed at each side face of battery stack 2. Alternatively, while not illustrated, the power supply device may have a plate-shaped bar formed of two metal sheets (divided into upper and lower parts) disposed at each side face of the battery stack.

(Engagement Block 5)

Each binding bar 4 in FIGS. 1 to 3 has engagement blocks 5 fixed to both ends of plate-shaped bar 6. In binding bar 4 here, engagement blocks 5 are respectively fixed to regions on inner side faces of both ends of plate-shaped bar 6, each of the regions disposed opposite a corresponding one of fitting parts 3a on an outer side face of end plate 3. Each engagement block 5 here is formed in a plate shape or a prismatic shape, the shape extending along the outer side face of each end plate 3. Each engagement block 5 is fixed to protrude toward corresponding fitting part 3a of end plate 3. Engagement block 5 is made of metal, and is preferably made of iron, an iron alloy, stainless steel (SUS), or aluminum. Engagement block 5 made of metal is welded to be fixed to an inner side of plate-shaped bar 6 (welded configuration). When welded to be fixed, engagement block 5 is preferably made of a same material as binding bar 4. Binding bar 4 here is mass-producible at low cost. Engagement block 5 may be, for example, spot welded to be fixed to the plate-shaped bar. In the configuration where engagement block 5 is spot welded to plate-shaped bar 6, it is possible to weld engagement block 5 to plate-shaped bar 6 at a border face between engagement block 5 and plate-shaped bar 6. In this state, the border edge has no step. Thus, when guided to fitting part 3a, engagement block 5 is brought into contact with stopper 3b without clearance. Alternatively, the engagement block may be fixed to the plate-shaped bar by using a coupling tool such as a rivet, or still alternatively, the engagement block may be fixed to the plate-shaped bar by using the coupling tool and the welded configuration concurrently.

In the stacked direction of battery cells, engagement block 5 has width (K) that is set to be a width sufficient not to be deformed by the tensile force applied to plate-shaped bar 6. Width (K) is set to be, for example, more than or equal to 3 mm. FIG. 4 is an enlarged sectional view of an area where binding bar 4 is coupled to end plate 3. FIG. 4 illustrates a state where engagement block 5 has no clearance at an inner side of its corners; in other words, engagement block 5 has a face opposing stopper 3b entirely abutting stopper 3b without clearance, and concurrently, the tip end face of stopper 3b is in contact with an inner face of plate-shaped bar 6 without clearance. As has been described above, in a positional relationship between binding bar 4 and end plate 3, engagement block 5 preferably has no clearance at the inner side of its corners, and the tip end face of stopper 3b is preferably in contact with the inner face of plate-shaped bar 6 without clearance. Alternatively, the tip end face of stopper 3b may have some clearance with respect to the inner face of plate-shaped bar 6. In this case, having width (K) of engagement block 5 set to be far greater than a dimension of the clearance (between the tip face of stopper 3b and the inner face of plate-shaped bar 6), for example, greater than 10 times the dimension, it is possible to resist tensile force F applied to binding bar 4 as shear stress.

Further, thickness (t) of engagement block 5 is set to be a thickness sufficient to cause the face of engagement block 5 opposing stopper 3b to reliably abut stopper 3b, so that engagement block 5 is resistible. For example, as illustrated in FIG. 4, in the configuration where engagement block 5 has no clearance at the inner side of its corners and the tip end face of stopper 3b is in contact with the inner face of plate-shaped bar 6 without clearance, thickness (t) of engagement block 5 is set to be more than or equal to 1 mm so that the face of engagement block 5 opposing stopper 3b reliably abuts and presses stopper 3b. Alternatively, as has been previously described, the tip end face of stopper 3b may have some clearance with respect to the inner face of plate-shaped bar 6. In this case, having width (K) of engagement block 5 set to be far greater than the dimension of the clearance (between the tip face of stopper 3b and the inner face of plate-shaped bar 6), for example, greater than 10 times the clearance, engagement block 5 resists tensile force F applied to binding bar 4 as the shear stress. Accordingly, width (K) of engagement block 5 is designed to be an optimal width based on a positional relationship between engagement block 5 and stopper 3b.

(Fixed Region 20)

As illustrated in FIGS. 1 to 4, fixed regions 20 are provided at both ends of binding bar 4. Each fixed region 20 is to be fixed to the outer face of end plate 3 with bolt 8. Each binding bar 4 here has both ends of plate-shaped bar 6 bent inward at 90 degrees to form bent regions 6b. Each bent region 6b is configured to serve as fixed region 20. Each fixed region 20 is configured to fix the corresponding end of binding bar 4 to the outer face of end plate 3, but is not required to have great strength. The reason is that engagement blocks 5 and stoppers 3b resist a large amount of tensile force applied to binding bar 4, and the tensile force is not applied to fixed regions 20. Each binding bar 4 in FIGS. 1 and 2 has a shape narrowing in substantial width toward a fixed part at a tip end of binding bar 4, the fixed part to be fixed to end plate 3. Binding bar 4 has two fixed regions 20 at each end, as an upper one and a lower one along the width, each having an approximately triangular shape in a front view. Each fixed region 20 has a tapered shape without being required to have great strength. With this configuration, binding bar 4 is reduced in weight and cost. Additionally, the number of areas to be fixed with bolt 8 is reduced and thus, a number of components is reduced, resulting in lower cost. Further, while not illustrated, binding bar 4 may be configured to have only one fixed region 20 at each end in order to achieve further reduction in cost. Still further, while not illustrated, plate-shaped bar 6 of binding bar 4 may have an opening in a region opposing the side face of battery stack 2 or in each bent region 6b in order to achieve further reduction in weight.

Each fixed region 20 is fixed to end plate 3 with bolt 8 that penetrates fixed region 20. Fixed region 20 as bent region 6b has, at its tip end, through-hole 6d, through which threaded part 8b of bolt 8 is inserted. Threaded part 8b is inserted into through-hole 6d and then is screwed into female screw hole 3c of end plate 3, causing fixed region 20 to be sandwiched between head part 8a of bolt 8 and end plate 3. In this state, fixed region 20 is fixed to the outer face of end plate 3. In the power supply device having this fixed configuration, engagement blocks 5 are guided to fitting parts 3a of end plate 3, so that stoppers 3b resist the tensile force applied to binding bar 4. Concurrently, fixed regions 20 at both ends of binding bar 4 are fixed to end plate 3. With this configuration, each binding bar 4 stably holds the pair of end plates 3 in fixed positions.

Figure 5:
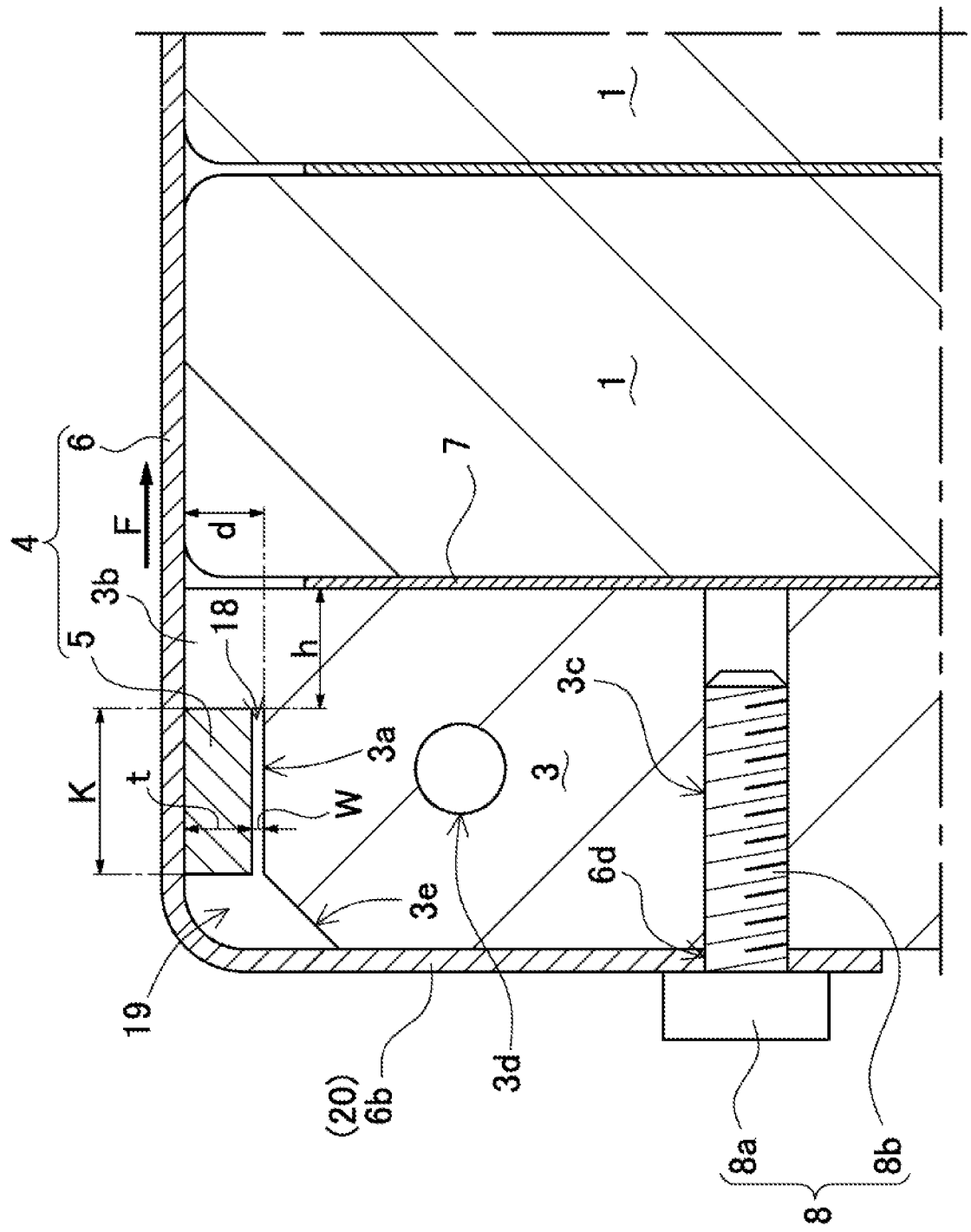
FIG. 5 is an enlarged sectional view of one of other examples of an end plate.

Further, in the power supply device in FIG. 4, engagement block 5 is engaged with stopper 3b, and fixed region 20 is fixed to end plate 3. In this state, plate-shaped bar 6 has impressed clearance 19 between an inner side of a corner of fixed region 20 and end plate 3 such that plate-shaped bar 6 does not hit a corner of end plate 3. In end plate 3 in FIG. 4, one end of fitting part 3a where engagement block 5 is disposed, which is the opposite side to stopper 3b, is open. As a result, unpressed clearance 19 is provided at the inner side of the corner of fixed region 20 (as a bending part) of plate-shaped bar 6. Alternatively, as illustrated in FIG. 5, the power supply device may have cutout 3e at the corner of end plate 3, the corner opposing the inner side of the corner of fixed region 20, so that unpressed clearance 19 is provided between end plate 3 and binding bar 4. With this configuration, unpressed clearance 19 of sufficient size is simply provided at the inner side of the corner of fixed region 20, and it is possible to effectively prevent strong force from being applied to fixed region 20 or end plate 3.

(Other Examples of End Plate)

Figure 6:
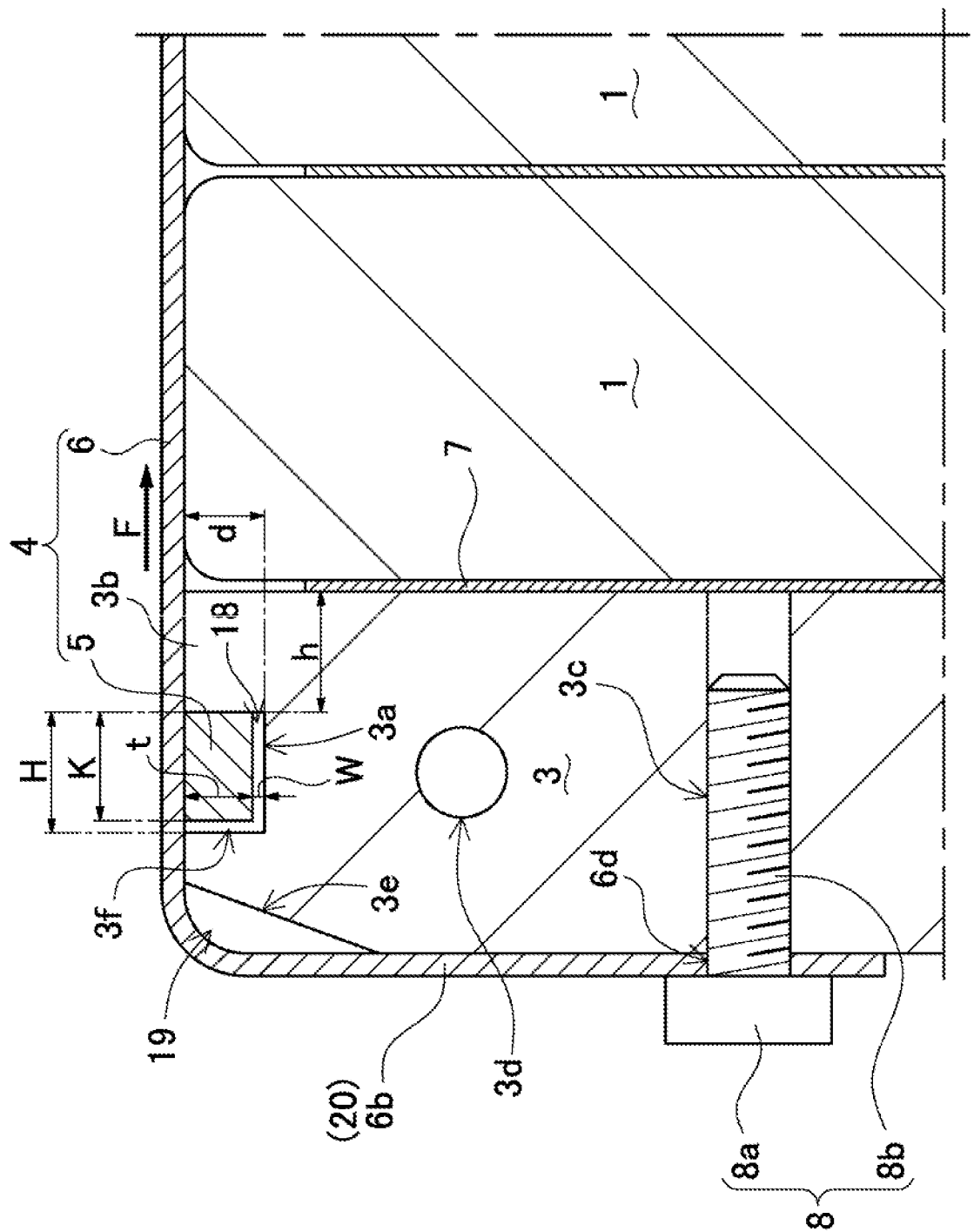
FIG. 6 is an enlarged sectional view of one of other examples of the end plate and a binding bar.

As has been described, end plate 3 includes fitting part 3a of a stepped shape, and stopper 3b disposed closer to battery stack 2 with respect to fitting part 3a. Alternatively, as illustrated in FIG. 6, the end plate may have fitting part 3a of a groove shape such that engagement block 5 is inserted into fitting part 3a. End plate 3 in FIG. 6 has groove 3f extending top to bottom along a central part of the outer side face of end plate 3, groove 3f serving as fitting part 3a. Here, end plate 3 has width (H) of groove 3f as fitting part 3a set to be greater than width (K) of engagement block 5, and has height (d) of stopper 3b as a depth of groove 3f set to be greater than thickness (t) of engagement block 5. End plate 3 here is coupled to binding bar 4 such that engagement block 5 inserted into fitting part 3a presses stopper 3b. Further, end plate 3 in FIG. 6 has cutout 3e of tapered shape at the corner of end plate 3, the corner opposing the inner side of the corner of fixed region 20. As a result, unpressed clearance 19 is provided between end plate 3 and binding bar 4. With this configuration, fixed region 20 of binding bar 4 is disposed and fixed to the outer side face of end plate 3 without difficulty.

(Other Examples of Fixed Configuration Between Engagement Block and Plate-Shaped Bar)

Figure 7:
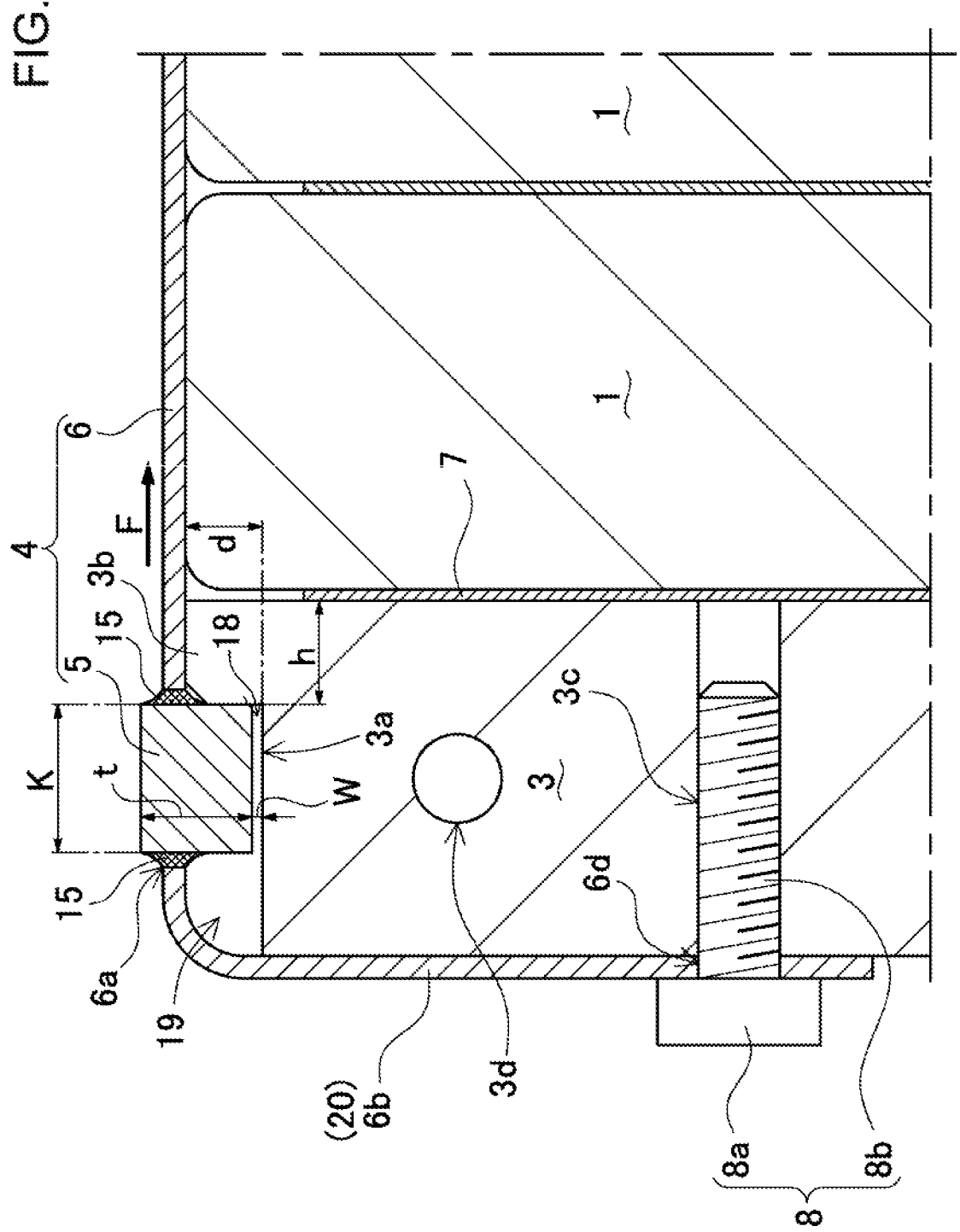
FIG. 7 is an enlarged sectional view of one of other examples of the binding bar.

As has been described above, binding bar 4 has engagement block 5 fixed to the inner side face of plate-shaped bar 6. Alternatively, as illustrated in FIG. 7, binding bar 4 may have fixing hole 6a at each end of plate-shaped bar 6, and engagement block 5 is to be inserted and fixed in fixing hole 6a. Binding bar 4 in FIG. 7 has fixing hole 6a pierced through plate-shaped bar 6. Binding bar 4 has engagement block 5 inserted into fixing hole 6a and has an outer peripheral face of engagement block 5 welded to an inner peripheral face of fixing hole 6a, so that engagement block 5 is fixed to plate-shaped bar 6. Binding bar 4 here has plate-shaped bar 6 including fixing hole 6a, the inner shape of which is slightly greater than an outer shape of engagement block 5. Binding bar 4 has engagement block 5 inserted into fixing hole 6a, and has an inner peripheral edge of fixing hole 6a and the outer peripheral face of engagement block 5 welded to each other. As a result, engagement block 5 is fixed to plate-shaped bar 6. Engagement block 5 in FIG. 7 is inserted into fixing hole 6a to slightly protrude from the face of plate-shaped bar 6. In this state, filler material 15 is provided between the outer peripheral face of the protruded part of engagement block 5 and plate-shaped bar 6. Engagement block 5 is welded around its entire perimeter to be fixed to fixing hole 6a. With this configuration, engagement block 5 is reliably fixed to plate-shaped bar 6 with high weld strength. Having engagement block 5 welded to be fixed into fixing hole 6a of plate-shaped bar 6, binding bar 4 has engagement block 5 and plate-shaped bar 6 integrally formed in a fitted configuration and the welded configuration. Accordingly, it is possible to couple engagement block 5 to plate-shaped bar 6 without reduction in strength of an area where fixing hole 6a is provided.

(Other Examples of Plate-Shaped Bar)

Figure 8:
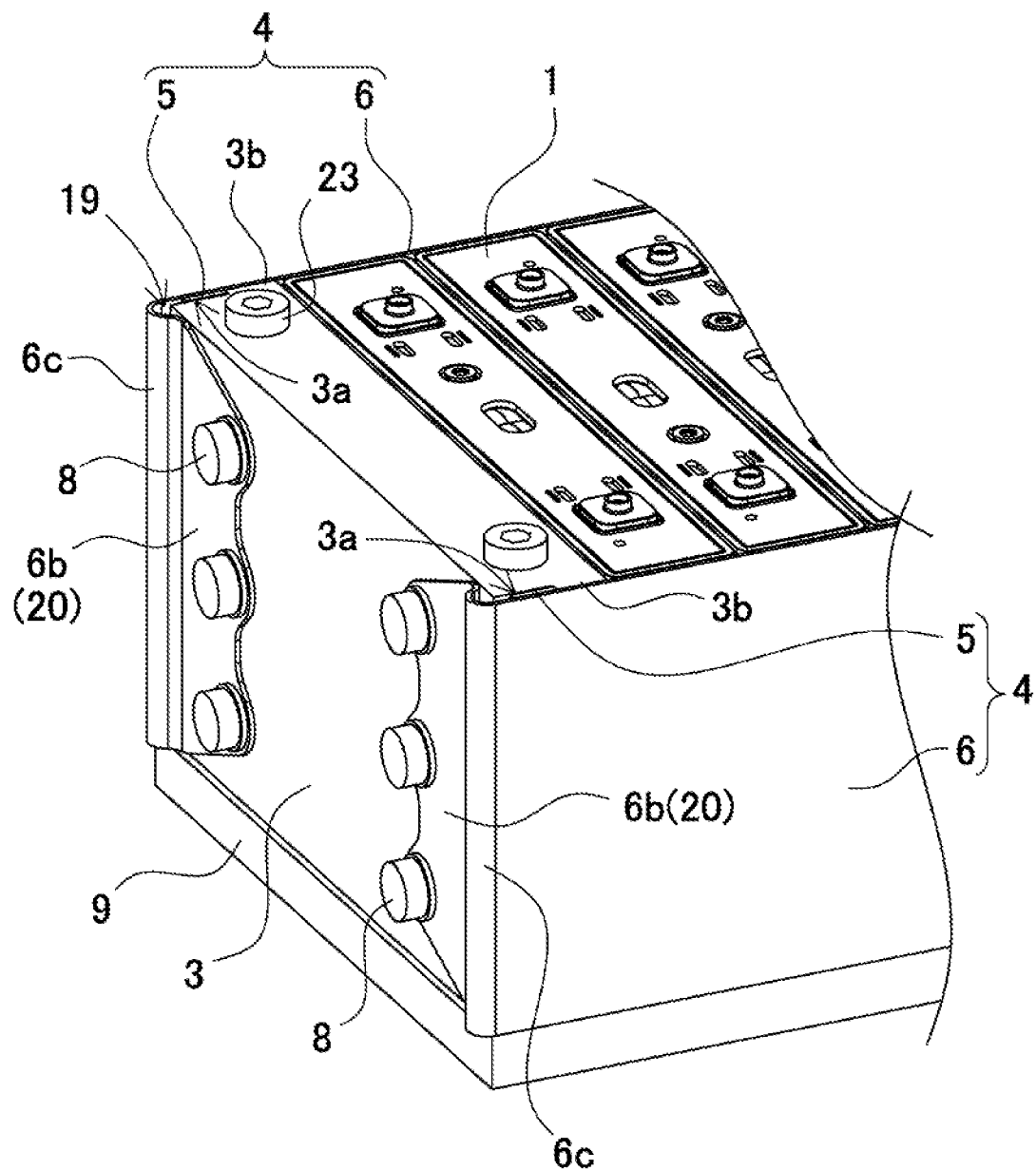
FIG. 8 is a perspective view of one of other examples of the end plate and the binding bar.
Figure 9:
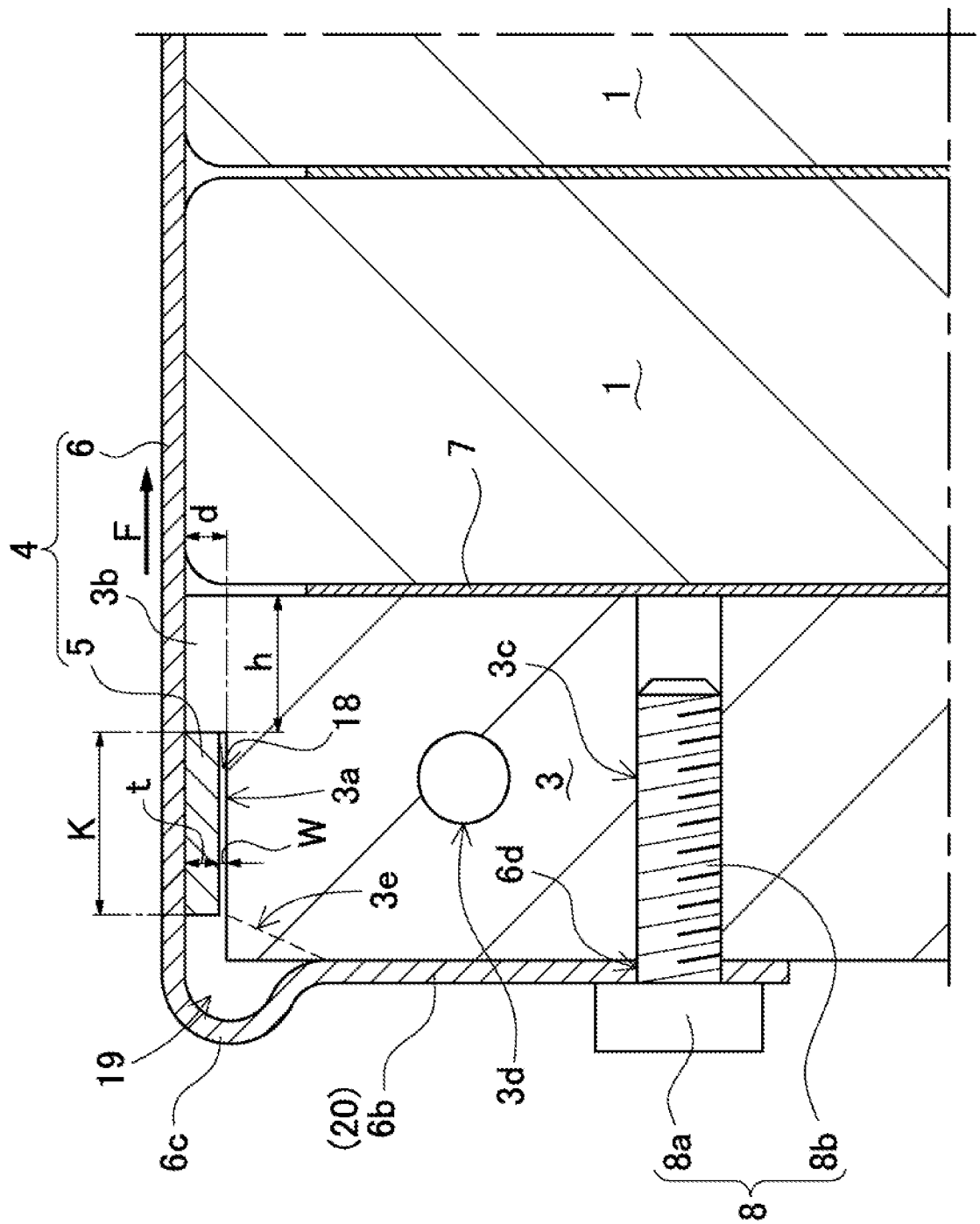
FIG. 9 is an enlarged sectional view of the end plate and the binding bar illustrated in FIG. 8.

Further, each binding bar 4 in FIGS. 8 and 9 includes fixed regions 20 as bent regions 6b, and U-shaped curved parts 6c at the corners of bent regions 6b. Each bent region 6b is formed of each end of plate-shaped bar 6 having been bent. Plate-shaped bar 6 here has an area, which is disposed closer to the end of plate-shaped bar 6 with respect to a fixed part (where engagement block 5 is to be fixed) and is disposed opposite the corner of end plate 3, curved in U-shape in plan view to form U-shaped curved part 6c. Fixed region 20 corresponds to a side toward the tip end from U-shaped curved part 6c, and fixed region 20 is fixed to end plate 3 with bolt 8. In binding bar 4 here, U-shaped curved part 6c curved in U-shape forms unpressed clearance 19 between end plate 3 and binding bar 4. In the configuration where U-shaped curved part 6c is provided at the corner of fixed region 20, U-shaped curved part 6c absorbs stress in order to effectively prevent strong force from being applied to a fastened point between fixed region 20 and end plate 3. Further, having U-shaped curved part 6c that extends top to bottom along the corner of end plate 3, it is possible to reinforce engagement block 5 by increasing width (K) of engagement block 5 without having an increase in size or in weight of end plate 3. Still further, as illustrated with a chain line in FIG. 9, having cutout 3e at the corner of end plate 3 opposing U-shaped curved part 6c, it is possible to increase unpressed clearance 19 between end plate 3 and binding bar 4.

Figure 10:
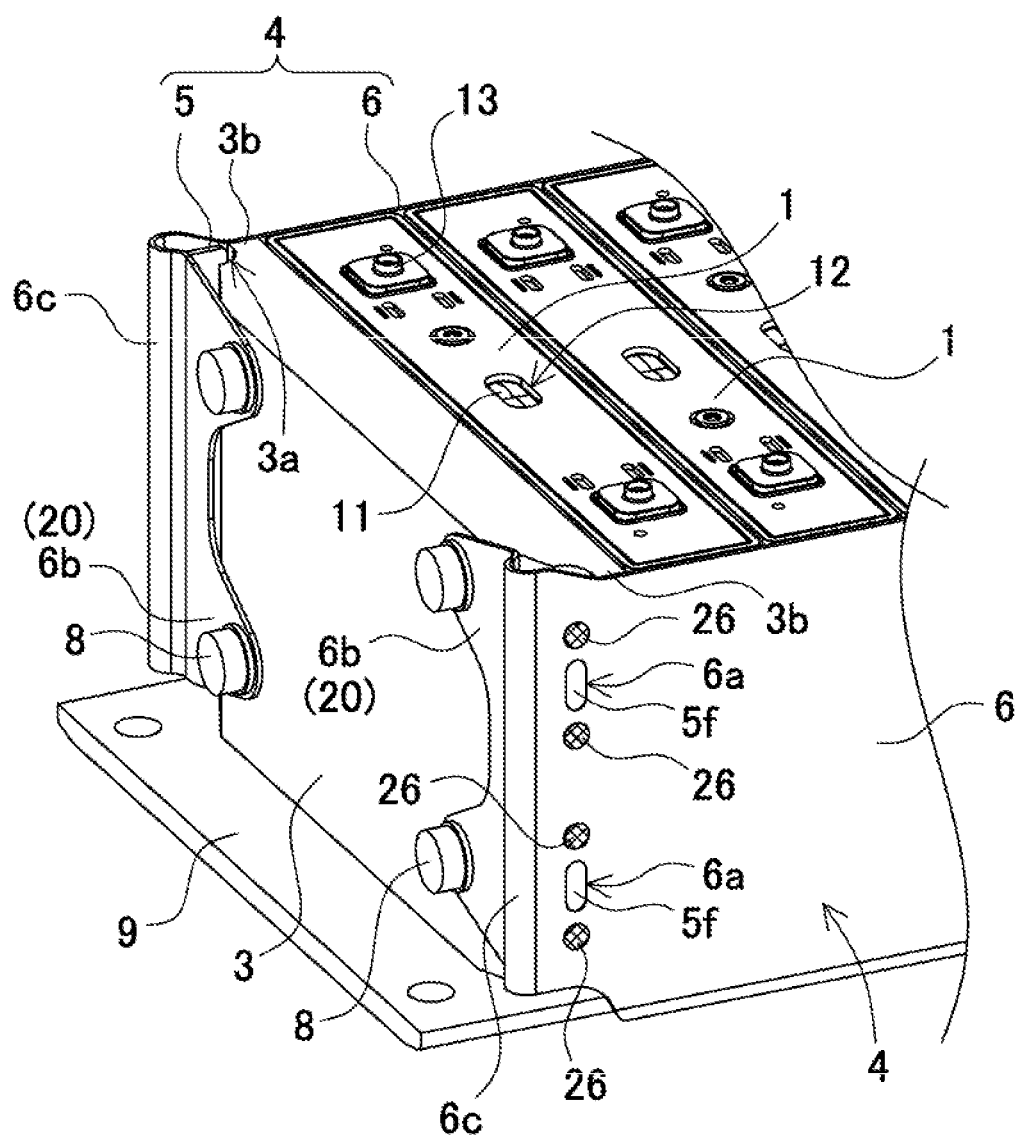
FIG. 10 is a perspective view of one of other examples of the end plate and the binding bar.
Figure 11:
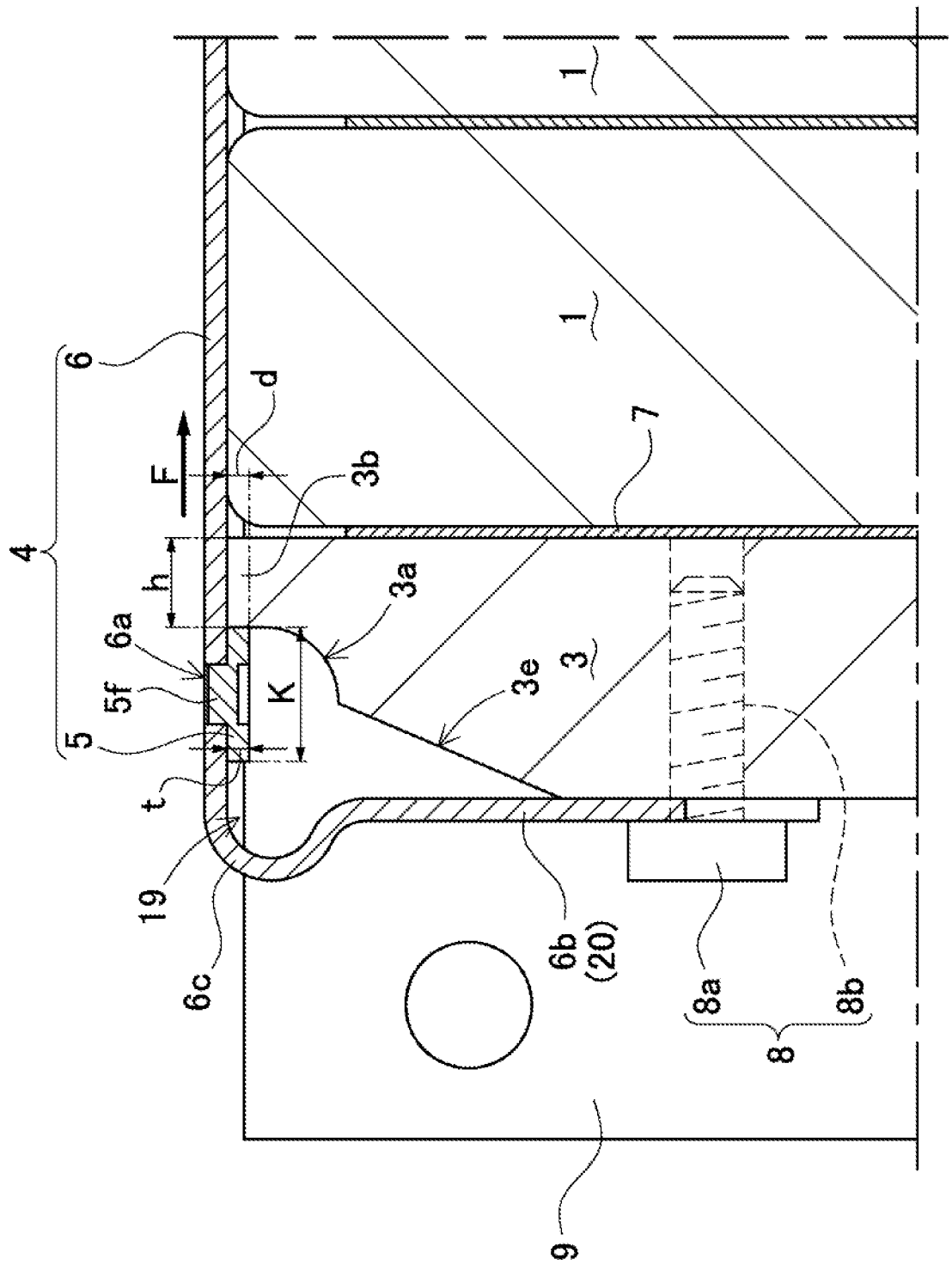
FIG. 11 is an enlarged sectional view of the end plate and the binding bar illustrated in FIG. 10.

Further, binding bar 4 may have a configuration illustrated in FIGS. 10 and 11. Binding bar 4 in FIGS. 10 and 11 includes fixed regions 20 as bent regions 6b, each formed of each end of plate-shaped bar 6 having been bent. Binding bar 4 also has each engagement block 5 fixed to a region on an inner side face of the end of plate-shaped bar 6, the region disposed opposite corresponding fitting part 3a on the outer side face of end plate 3. Binding bar 4 here has fixing holes 6a in plate-shaped bar 6, and a part of engagement block 5 is to be inserted into each of fixing holes 6a. Thus, engagement block 5 is fixed to plate-shaped bar 6 in the fitted configuration. Plate-shaped bar 6 has, at its each end disposed opposite corresponding fitting part 3a of end plate 3, two fixing holes 6a that are pierced through plate-shaped bar 6 at upper side and lower side and are spaced from each other. FIG. 10 illustrates fixing holes 6a, each having an oval shape and extending top to bottom.

As illustrated in FIG. 11, engagement block 5 is disposed at a region at the inner side of plate-shaped bar 6, the region including fixing hole Ga. Concurrently, engagement block 5 includes fitted protrusion 5f at an area opposing fixing hole 6a. Fitted protrusion 5f protrudes outward (in a thickness direction of engagement block 5). Fitted protrusion 5f has an outer shape to follow an inner shape of fixing hole 6a. Fitted protrusion 5f is shaped to follow fixing hole 6a as a through-hole, for example, in the following steps: in a state where engagement block 5 is disposed on the inner side face of plate-shaped bar 6 with fixing hole 6a pierced through plate-shaped bar 6, the region of engagement block 5 opposing fixing hole 6a is pressed (e.g., punch-pressed) from the inner side such that a part of engagement block 5 is protruded outward. Engagement block 5 has fitted protrusion 5f formed by punch-pressing, and then has fitted protrusion 5f press-fitted into fixing hole 6a without clearance. As a result, engagement block 5 is coupled to plate-shaped bar 6 in the fitted configuration. Alternatively, engagement block 5 may have fitted protrusion 5f previously formed in a predetermined shape, and then has fitted protrusion 5f inserted into fixing hole 6a. In this state too, engagement block 5 is coupled to plate-shaped bar 6 in the fitted configuration. Further, engagement block 5 may have fitted protrusion 5f formed by cutting or casting, instead of pressing.

Further, binding bar 4 in FIG. 10 has each engagement block 5 spot welded to plate-shaped bar 6, below and above each area where engagement block 5 is coupled to plate-shaped bar 6 in the fitted configuration, in other words, below and above each fixing hole Ga. In FIG. 10, weld marks 26 caused by this spot welding are illustrated by cross-hatching. As has been described above, engagement block 5 is fixed to plate-shaped bar 6 in concurrent use of the fitted configuration and the welded configuration, so that engagement block 5 is further firmly fixed to plate-shaped bar 6. Here, binding bar 4 and end plate 3 respectively maintain width (K) and thickness (t) of engagement block 5 within a range previously described and maintain width (h) and height (d) of stopper 3b within a range previously described. With this configuration, binding bar 4 and end plate 3 resist tensile force F applied to plate-shaped bar 6 as the shear stress and achieve sufficient strength.

Further, each binding bar 4 in FIGS. 10 and 11 has the corner of each bent region 6b of plate-shaped bar 6 curved in U-shape in plan view to form U-shaped curved part 6c. Fixed region 20 corresponds to the side toward the tip end from U-shaped curved part 6c, and is fixed to end plate 3 with bolt 8. Here, unpressed clearance 19 is formed between U-shaped curved part 6c and end plate 3. Particularly, end plate 3 in FIG. 11 has fitting part 3a formed in depth and has cutout 3e formed at the corner opposing U-shaped curved part 6c. With this configuration, unpressed clearance 19 between end plate 3 and binding bar 4 is increased, resulting in reduced overall weight.

Figure 12:
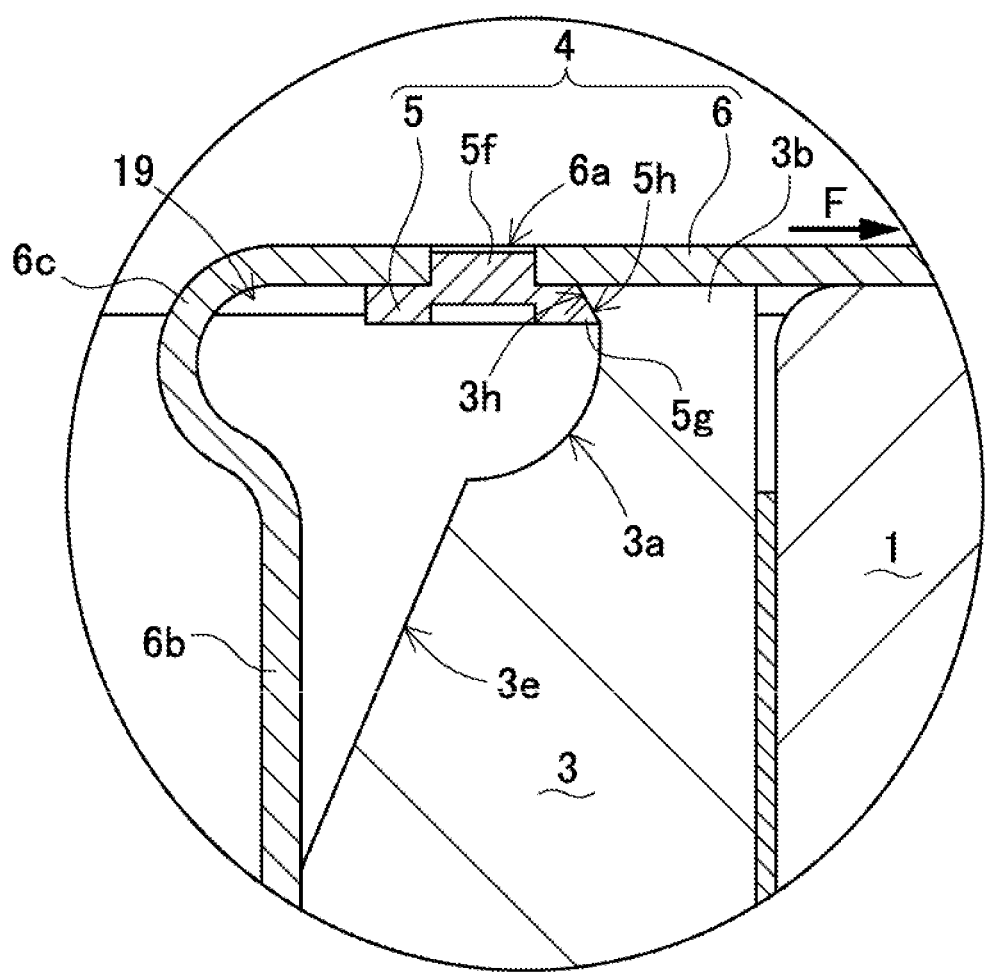
FIG. 12 is an enlarged sectional view of one of other examples of the end plate and the binding bar.

Further, as illustrated in FIG. 12, engagement block 5 of binding bar 4 and stopper 3b of end plate 3 may be coupled to each other in an engaged configuration. In end plate 3 in FIG. 12, stopper 3b includes, at its tip end, cut face 3h of an undercut shape as a face opposing engagement block 5. Engagement block 5 includes, at a side closer to battery stack 2, engaged protrusion 5g, which is to be fitted into the corner between fitting part 3a and stopper 3b. Engaged protrusion 5g has engaged face 5h as a face opposing stopper 3b. Engaged face 5h is disposed along cut face 3h. This engaged configuration effectively prevents binding bar 4 from moving out of position toward the side face of battery stack 2, and increases the coupling strength between engagement block 5 (fixed to each end of binding bar 4) and stopper 3b to ensure stable fastening. Alternatively, the engaged configuration between binding bar 4 and end plate 3 may be a fitted configuration, such as follows: a configuration where any one of the face of engagement block 5 and the face of stopper 3b, each face opposing the other, has a protrusion, the other of the faces has a recess, and then, the protrusion is fitted into the recess; or, a configuration where any one of the faces has a ridge extending top to bottom, the other of the faces has a recess or a groove extending top to bottom, and then the ridge is fitted into the recess or the groove.

With regard to binding bar 4 in FIG. 12, in the process of assembling the power supply device, end plates 3 are disposed and pressed by the press machine (not illustrated) at both ends of battery stack 2 such that battery cells 1 are pressed to be held in the stacked direction. In this state, each engaged protrusion 5g is guided into fitting part 3a of end plate 3. When each binding bar 4 has had engagement blocks 5 at its both ends engaged to the pair of end plates 3, the press machine stops pressing, and battery stack 2 is held pressed at predetermined pressure. Note that, by sliding binding bar 4 top to bottom with respect to battery stack 2 that is being pressed by the press machine, it is possible to carry out this coupling without over pressing battery cells 1. Alternatively, battery stack 2 may be somewhat over pressed in the stacked direction, and a dimension of end plate 3 at each end of battery stack 2 may be reduced by a protruded amount of engaged protrusion 5g. In this state too, engaged protrusion 5g is guided into fitting part 3a, and when the press machine has stopped pressing, binding bars 4 hold battery stack 2 pressed at predetermined pressure.

(Other Examples of Binding Bar)

Figure 13:
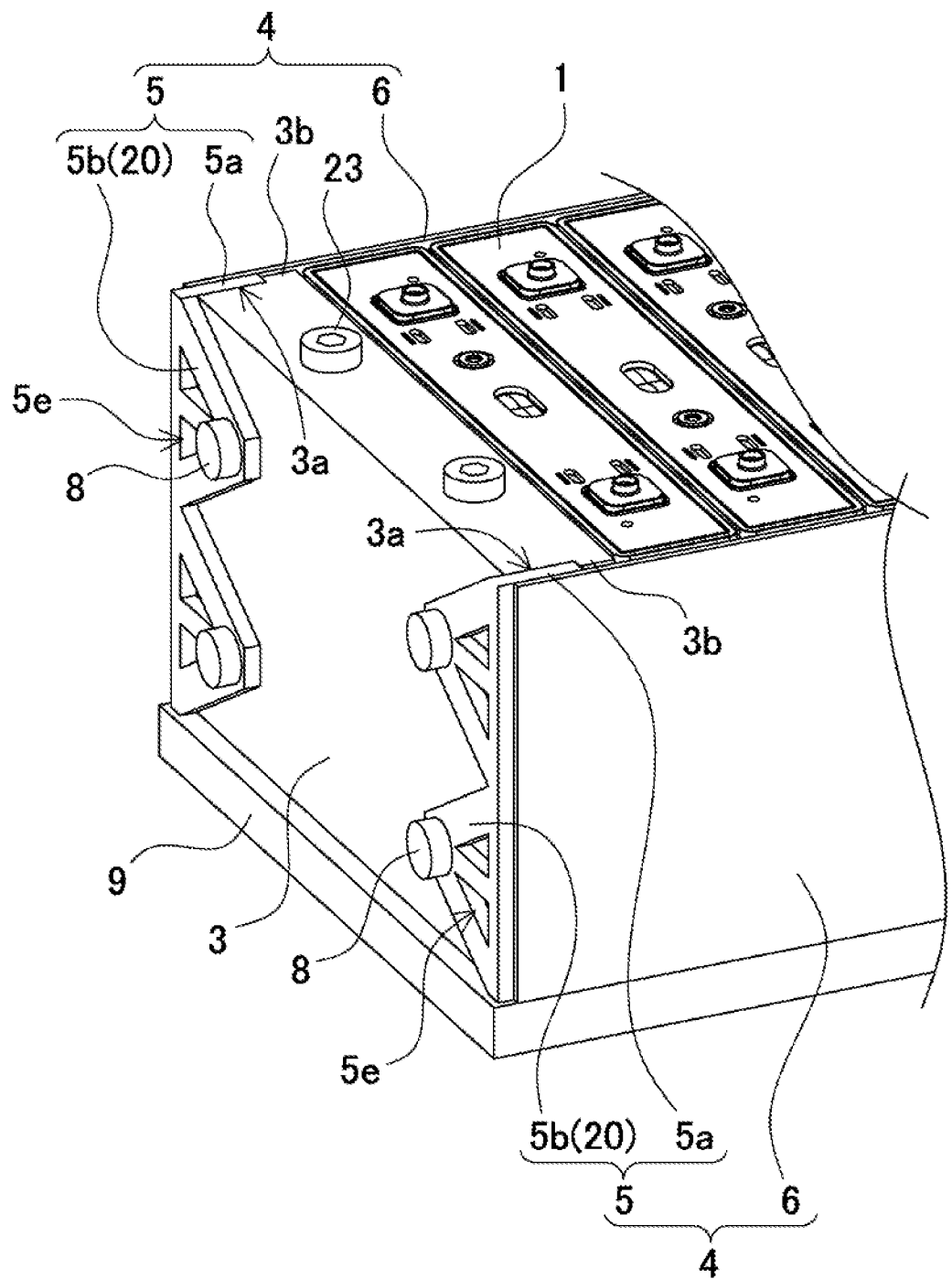
FIG. 13 is a perspective view of one of other examples of the end plate and the binding bar.
Figure 14:
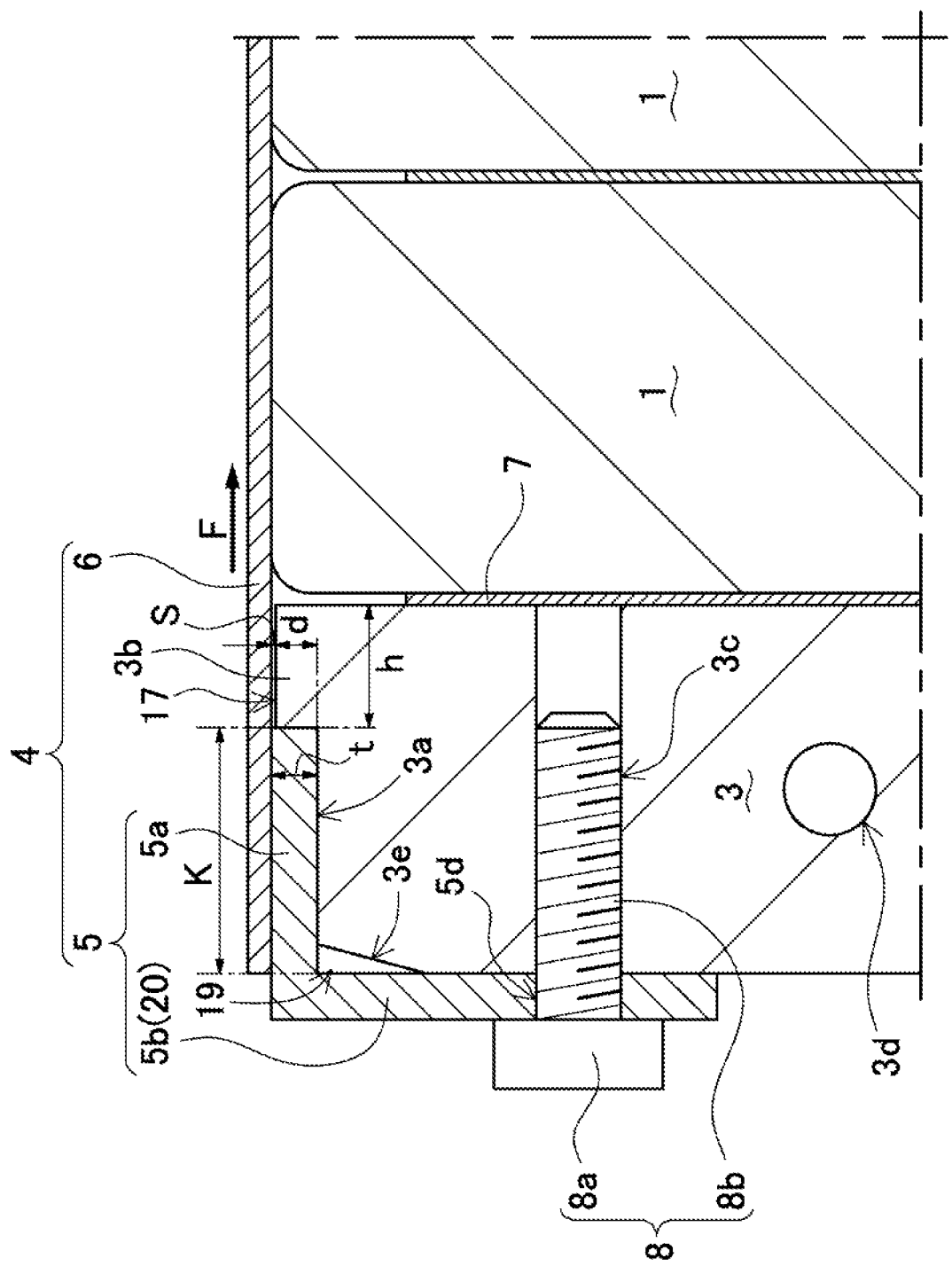
FIG. 14 is an enlarged sectional view of the end plate and the binding bar illustrated in FIG. 13.
Figure 15:
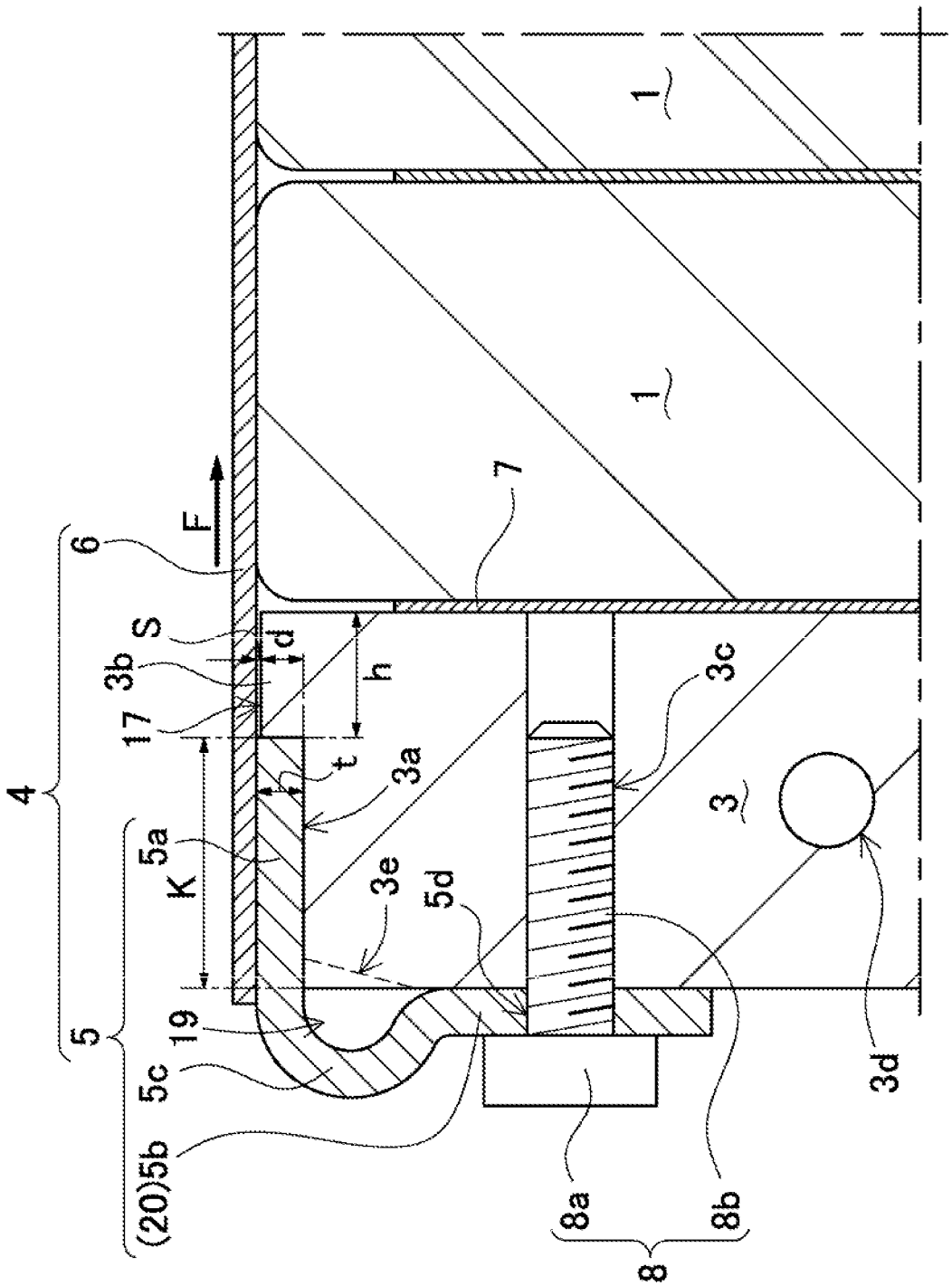
FIG. 15 is an enlarged sectional view of one of other examples of the binding bar.

As has been described above, each binding bar 4 has engagement block 5 fixed to each end of plate-shaped bar 6, and concurrently, has a part of the end of plate-shaped bar 6 (that is disposed outward beyond engagement block 5) bent to form fixed region 20. In other words, binding bar 4 includes fixed region 20 as bent region 6b that is formed of each end of plate-shaped bar 6 having been bent. Alternatively, as illustrated in FIGS. 13 to 15, each binding bar 4 may have fixed region 20 and engagement block 5 integrally formed. Binding bar 4 in each of FIGS. 13 to 15 has engagement block 5 fixed to each end of plate-shaped bar 6, and concurrently, has an end of engagement block 5 bent to form fixed region 20.

Each engagement block 5 in FIGS. 13 and 14 has an L-shaped cross sectional shape, and one side of the bent part corresponds to fixed part 5a fixed to the inner face of the end of plate-shaped bar 6, and the other side of the bent part, i.e., bent region 5b, corresponds to fixed region 20 fixed to the outer face of end plate 3. Fixed part 5a of engagement block 5 is fixed to plate-shaped bar 6 by, for example, using the welded configuration. As illustrated with engagement block 5 in FIG. 14, fixed part 5a is disposed in fitting part 3a of end plate 3, and an end face of fixed part 5a is brought to abut stopper 3b. With this configuration, engagement block 5 and stopper 3b resist tensile force F applied to binding bar 4. Further in FIG. 14, at an inner side of the corner of bent region 5b, end plate 3 has cutout 3e of a taper shape at the corner of end plate 3. Thus, unpressed clearance 19 is formed between end plate 3 and binding bar 4.

Here, engagement block 5 is a plate that is greater in thickness than plate-shaped bar 6, and has fixed part 5a (that is to be fixed to plate-shaped bar 6) protruded from plate-shaped bar 6. With this configuration, fixed part 5a is reliably disposed in fitting part 3a and abuts the stopper. In FIG. 14, clearance 17 is formed between the tip end face of stopper 3b and binding bar 4. Here, having thickness (t) of engagement block 5 set to be far greater than dimension (S) of clearance 17, for example, greater than 10 times dimension (S), engagement block 5 is configured to resist tensile force F applied to binding bar 4 as the shear stress. For example, when dimension (S) of this clearance is 0.3 mm, width (K) of fixed part 5a (i.e., distance until the corner of bent part) of engagement block 5 corresponds to 3 mm.

Fixed region 20 as bent region 5b of engagement block 5 is fixed to end plate 3 with bolt 8 penetrating fixed region 20. Bent region 5b has, at its tip end, through-hole 5d, through which threaded part 8b of bolt 8 is inserted. As has been previously described, each fixed region 20 in FIG. 13 has the shape narrowing in substantial width toward the fixed part at the tip end of fixed region 20, the fixed part to be fixed to end plate 3. Further, each fixed region 20 in FIG. 13 has a thinning configuration where a plurality of openings 5e are formed. Fixed region 20 has the tapered shape and includes openings 5e. This configuration causes engagement block 5 to be reduced in weight and cost, and prevents strong force from being applied to each fixed point, i.e., each point to be fixed with bolt 8. Each engagement block 5 here has two fixed regions 20, one at upper side and the other at lower side, but alternatively, the engagement block may have one fixed region at a center.

Further, binding bar 4 in FIG. 15 includes fixed region 20 as bent region 5b of engagement block 5, along with U-shaped curved part 5c at the corner of bent region 5b. Here, engagement block 5 has an area, which is disposed closer to the end of plate-shaped bar 6 with respect to fixed part 5a (that is fixed to plate-shaped bar 6) and is disposed opposite the corner of end plate 3, curved in U-shape in plan view to form U-shaped curved part 5c. Fixed region 20 corresponds to a side toward the tip end from U-shaped curved part 5c, and is fixed to end plate 3 with bolt 8. In this power supply device, unpressed clearance 19 is formed between end plate 3 and U-shaped curved part 5c at the corner of bent region 5b. Here, engagement block 5 fixed to plate-shaped bar 6 includes bent region 5b as fixed region 20, along with U-shaped curved part 5c at the corner of bent region 5b. This configuration effectively prevents engagement block 5 from being deformed even when strong force is applied to engagement block 5, and thus stably holds end plate 3 in the fixed position. Further, as illustrated with a chain line in FIG. 15, having cutout 3e at the corner of end plate 3 opposing U-shaped curved part 5c, it is possible to increase unpressed clearance 19 between end plate 3 and binding bar 4.

Power supply device 100 in FIGS. 1 and 2 includes base plate 9 on which battery stack 2 is mounted. Base plate 9 has end plates 3 fixed thereto. In order to be fixed to base plate 9, each end plate 3 has, at its both sides, through-holes 3d, each extending in a direction parallel to battery cells 1 and extending top to bottom in FIGS. 1 and 2. Fixing screw 23 is inserted into each of through-holes 3d. Fixing screw 23 has its tip end fixed to base plate 9, so that end plate 3 is fixed to base plate 9. Fixing screw 23 is screwed into each of female screw holes 9a in the base plate 9 to be fixed to base plate 9, or is screwed into a nut on a bottom face of the base plate to be fixed to the base plate. Note that, in the foregoing exemplary embodiment, the binding bar is configured to have each fixed region (formed at each end of the binding bar) fixed to the face of the corresponding end plate with bolts. The binding bar may also be fixed to the base plate with bolts.

Figure 16:
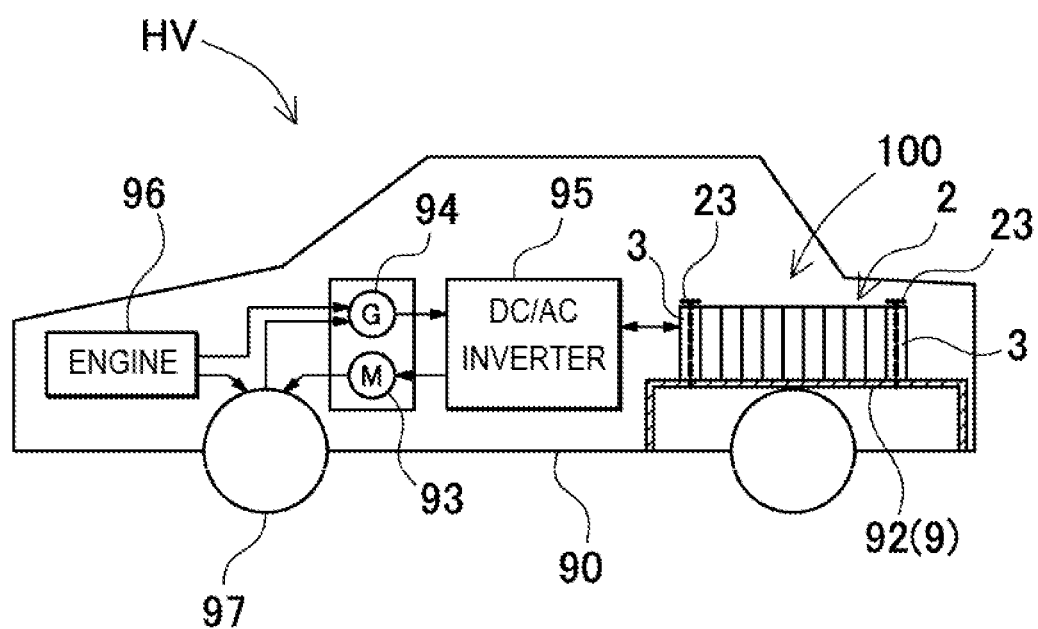
FIG. 16 is a block diagram of an example of a hybrid vehicle equipped with the power supply device, the hybrid vehicle running on both an engine and a motor.
Figure 17:
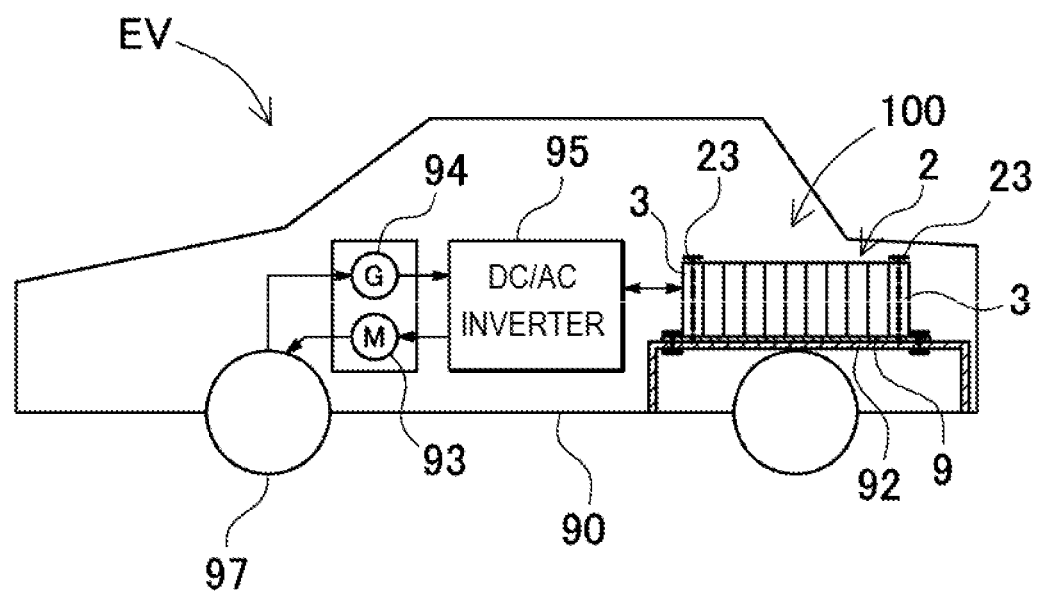
FIG. 17 is a block diagram of an example of an electric vehicle equipped with the power supply device, the electric vehicle running on the motor only.

As illustrated in FIG. 16, power supply device 100 is mounted to a vehicle to supply power to motor 93 for driving the vehicle and has base plate 9 as chassis 92 of the vehicle. When power supply device 100 has been placed on chassis 92 of the vehicle, power supply device 100 has fixing screw 23 inserted into through-hole 3d of end plate 3, and then has fixing screw 23 screwed into a female screw hole (not illustrated) of chassis 92. As a result, power supply device 100 is fixed to chassis 92 of the vehicle. Here, power supply device 100 has base plate 9 as chassis 92 of the vehicle, but the base plate is not necessarily specified as a chassis of a vehicle. For example, as illustrated in FIG. 17, base plate 9 may be a metal sheet, and power supply device 100 may be fixed on base plate 9 as the metal sheet. Then, base plate 9 is fixed to chassis 92 of the vehicle, so that power supply device 100 is mounted to the vehicle.

Power supply device 100 in the foregoing description is assembled in a process as follows:

(1) A predetermined number of battery cells 1 are stacked in the thickness direction of battery cells 1 with spacers 7 each interposed between battery cells 1, and as a result, battery stack 2 is formed.

(2) The pair of end plates 3 are disposed at both ends of battery stack 2. Then, end plates 3 are pressed by a press machine (not illustrated) at both ends of battery stack 2 such that end plates 3 press battery stack 2 at predetermined pressure and hold battery cells 1 in a pressed state.

(3) In the state where the pair of end plates 3 press battery stack 2, each binding bar 4 is coupled and fixed to end plates 3. Binding bar 4 is disposed such that engagement blocks 5 at both ends of binding bar 4 are respectively guided to fitting parts 3a of the pair of end plates 3. Concurrently, fixed regions 20 at both ends of binding bar 3 are respectively fixed to the outer faces of end plates 3 with bolts 8. When each binding bar 4 has been fixed to the pair of end plates 3, pressing stops.

(4) At both sides of battery stack 2, electrode terminals 13 of each adjacent two of battery cells 1 oppose each other and are connected via bus bars (not illustrated). The bus bars are fixed to electrode terminals 13 to connect battery cells 1 in series, or both in series and in parallel. The bus bars are welded to electrode terminals 13 or screwed in to be fixed to electrode terminals 13.

(5) Battery stack 2 is disposed on an upper face of base plate 9 to be fixed to base plate 9.

The power supply device in the foregoing description is optimally used as a power supply device for a vehicle. The power supply device is configured to supply power to a motor for driving an electric vehicle. The electric vehicle equipped with the power supply device includes an electric vehicle running on a motor only, a plug-in hybrid vehicle or a hybrid vehicle running on both an engine and a motor. These electric vehicles use the power supply device as a power source.

(Power Supply Device for Hybrid Vehicle)

FIG. 16 illustrates an example of a hybrid vehicle equipped with the power supply device, the hybrid vehicle running on both an engine and a motor. Vehicle HV equipped with the power supply device in FIG. 16 includes vehicle body 90, engine 96, motor 93, power supply device 100, generator 94, and wheels 97. Engine 96 and motor 93 are configured to drive vehicle body 90; power supply device 100 is configured to supply power to motor 93; generator 94 is configured to charge batteries for power supply device 100; and wheels 97 are configured to be operated by motor 93 and engine 96 to drive vehicle body 90. Power supply device 100 is connected to motor 93 and generator 94 via DC/AC inverter 95. Vehicle HV runs on both motor 93 and engine 96 while charging and discharging the batteries for power supply device 100. In operational modes where engine efficiency is poor, for example, during acceleration or low speed cruise, motor 93 is operated to drive the vehicle. Motor 93 is operated on power supplied from power supply device 100. Generator 94 is operated by engine 96 or by regenerative braking when the vehicle brake pedal is pressed, and charges the batteries for power supply device 100.

(Power Supply Device for Electric Vehicle)

Further, FIG. 17 illustrates an example of an electric vehicle equipped with the power supply device, the electric vehicle running on a motor only. Vehicle EV equipped with the power supply device in FIG. 17 includes vehicle body 90, motor 93, power supply device 100, generator 94, and wheels 97. Motor 93 is configured to drive vehicle body 90; power supply device 100 is configured to supply power to motor 93; generator 94 is configured to charge batteries for power supply device 100; and wheels 97 are configured to be operated by motor 93 to drive vehicle body 90. Motor 93 is operated on power supplied from power supply device 100. Generator 94 is operated by energy from regenerative braking of vehicle EV, and charges the batteries for power supply device 100.

(Power Supply Device for Power Storage Device)

Figure 18:
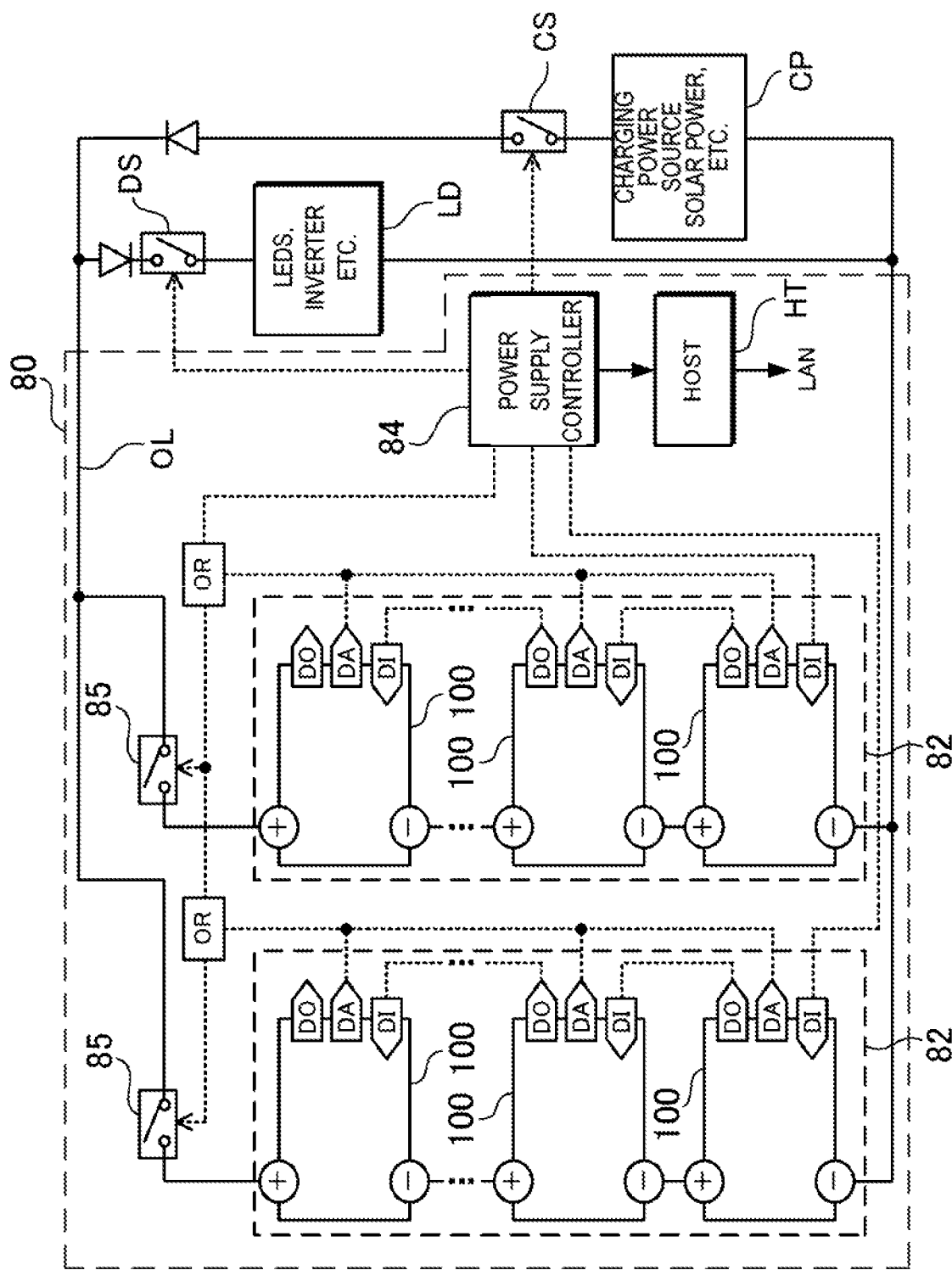
FIG. 18 is a block diagram of an example of a power storage device equipped with the power supply device.

Further, with regard to an application of a power supply device, the present invention is not limited to a power supply device mounted to an electric vehicle. Accordingly, a power supply device according to the present invention may be applied to store large power, for example, as a power supply device mounted to a power storage device for storing natural energy such as solar power or wind power, or as a power supply device mounted to a power storage device for storing late-night power. For example, the power supply device is applicable as a power supply system in private homes or manufacturing facilities, and the power supply system is charged by solar power, late-night power, or the like and is discharged when required. Alternatively, the power supply device is applicable as a streetlight power source charged by solar power during daylight and discharged at night, or as a backup power source for operating traffic signals during power failure. FIG. 18 shows an example of such power supply devices. Note that, as an exemplary power storage device, FIG. 18 shows power storage device 80 with a large capacity and high power. In order to gain desired power, power storage device 80 includes a plurality of the power supply devices described above and connected in series or in parallel, along with required controlling circuits.

Power storage device 80 in FIG. 18 has a plurality of power supply devices 100 connected in units to form each power supply unit 82. Each power supply device 100 has a plurality of battery cells connected in series and/or parallel. Each power supply device 100 is controlled by power supply controller 84. Power storage device 80 charges power supply unit 82 with charging power source CP, and then operates load LD. Accordingly, power storage device 80 includes a charging mode and a discharging mode. Load LD and charging power source CP are each connected to power storage device 80 via discharging switch DS and charging switch CS. Discharging switch DS and charging switch CS are each controlled to be ON and OFF by power supply controller 84 in power storage device 80. In the charging mode, power supply controller 84 switches charging switch CS "ON" and discharging switch DS "OFF", so as to allow power storage device 80 to be charged from charging power source CP. When power storage device 80 has been fully charged or charged to a capacity more than or equal to a predetermined value, power supply controller 84 switches charging switch CS "OFF" and discharging switch DS "ON" in response to demand from load LD, so as to allow discharge from power storage device 80 to load LD. Further, as required, charging switch CS and discharging switch DS may be both turned ON, so as to allow power to be supplied to load LD and concurrently to allow power storage device 80 to be charged.

Power storage device 80 operates load LD that is connected to power storage device 80 via discharging switch DS. In the discharging mode of power storage device 80, power supply controller 84 switches discharging switch DS "ON" to have load LD connected to power storage device 80, so that load LD is operated with power from power storage device 80. Discharging switch DS may be a switching device such as a field effect transistor (FET). Discharging switch DS is controlled to be ON and OFF by power supply controller 84 in power storage device 80. Additionally, power supply controller 84 includes a communication interface to communicate with an externally connected device. In the example of FIG. 18, power supply controller 84 is connected to host device HT via known protocols such as universal asynchronous receiver transmitter (UART) and recommended standard-232 (RS-232C). Further, as required, a user interface may be provided to allow a user to directly operate the power supply system.

Each power supply device 100 includes a signal terminal and a power source terminal. The signal terminal includes input/output terminal DI, abnormality output terminal DA, and connecting terminal DO. Input/output terminal DI allows output and input of signals to and from power supply controller 84 or other power supply devices 100. Connecting terminal DO allows output and input of signals to and from other power supply devices 100. Abnormality output terminal DA serves to output abnormalities of power supply device 100 to external devices. The power source terminal allows each power supply device 100 to be connected to the other in series or parallel. Each power supply unit 82 is connected to output line OL via parallel connecting switch 85 to further be connected to the other power supply unit 82 in parallel.

INDUSTRIAL APPLICABILITY

The present invention provides a power supply device, a vehicle equipped with the power supply device, and a power storage device equipped with the power supply device; the power supply device according to the present invention is preferably applicable as a power supply device for a vehicle such as a plug-in hybrid electric vehicle and a hybrid electric vehicle (HEV) mode that switch between an electric vehicle (EV) mode, a hybrid electric vehicle, or an electric vehicle. Further, the power supply device is appropriately applicable as: a backup power supply device mountable to a computer server rack; a backup power supply device for a wireless base station for, for example, cellular phones; a power supply device for a power storage device combined with solar cells, such as a power source for storing power in private homes or manufacturing facilities, or a streetlight power source; or a backup power source for traffic signals.

The invention claimed is:

1. A power supply device comprising:
a battery stack configured to have a plurality of battery cells stacked together;
a pair of end plates disposed at both ends of the battery stack in a stacked direction of the battery stack; and
a binding bar configured to have both ends of the binding bar coupled to the pair of end plates, wherein
the binding bar includes a plate-shaped bar that extends in the stacked direction of the battery stack, and an engagement block that is fixed to the plate-shaped bar and protrudes as a face opposing an outer peripheral face of one of the pair of end plates, and
the one of the pair of end plates includes a fitting part to which the engagement block is guided, on the outer peripheral face of the one of the pair of end plates, and includes a stopper that is disposed at a side of the battery stack with respect to the fitting part and abuts the engagement block,
wherein the binding bar further includes a fixed region at each end of the binding bar, the fixed region to be fixed to an outermost major surface of a corresponding end plate of the pair of end plates located outward from the stopper in the stacked direction,
the fixed region protrudes farther inward than the engagement block in a direction perpendicular to the stacked direction, and
the fixed region is configured to abut the outermost major surface of the corresponding end plate in the stacked direction.

2. The power supply device according to claim 1, wherein the fixed region corresponds to a bent region of the plate-shaped bar.

3. The power supply device according to claim 2, wherein the fixed region is formed of the bent region of the plate-shaped bar, and
when a U-shaped curved part is formed at a corner of the bent region, an unpressed clearance is formed between the fixed region and each of the pair of end plates.

4. The power supply device according to claim 1, wherein the fixed region is integrally formed with the engagement block, and
the fixed region corresponds to an end of the engagement block having an L-shaped cross sectional shape.

5. The power supply device according to claim 4, wherein the fixed region is integrally formed with the engagement block, and
when a U-shaped curved part is formed at a corner of the fixed region, an unpressed clearance is formed between the fixed region and the one of the pair of end plates.

6. The power supply device according to claim 1, wherein the fixed region is fixed to an outer face of the one of the pair of end plates with a bolt.

7. The power supply device according to claim 1, wherein an unpressed clearance is formed between an inner side of a corner of the fixed region and the one of the pair of end plates.

8. The power supply device according to claim 7, wherein when a cutout is formed at a corner of the one of the pair of end plates, the corner of the one of the pair of end plates opposing the inner side of the corner of the fixed region, the unpressed clearance is formed between the binding bar and the one of the pair of end plates.

9. The power supply device according to claim 1, wherein the fixed region has a shape narrowing in substantial width toward a fixed part at a tip end of the fixed region, the fixed part to be fixed to the each of the pair of end plates.

10. The power supply device according to claim 1, wherein the engagement block is fixed to the plate-shaped bar in a welded configuration.

11. The power supply device according to claim 1, wherein the plate-shaped bar and the engagement block is made of any one of iron, an iron alloy, stainless steel (SUS), aluminum, and an aluminum alloy.

12. The power supply device according to claim 1, wherein
the engagement block has a thickness (t) of more than or equal to 1 mm.

13. The power supply device according to claim 1, wherein the engagement block has a width (K) in the stacked direction of the plurality of battery cells, the width (k) of more than or equal to 3 mm.

14. The power supply device according to claim 1, wherein the stopper has a width (h) in the stacked direction of the plurality of battery cells, the width (h) of more than or equal to 3 mm.

15. An electric vehicle equipped with the power supply device according to claim 1, the electric vehicle further comprising:
a motor for driving, the motor to which the power supply device supplies power;
a vehicle body on which each of the power supply device and the motor is mounted; and
a wheel configured to be operated by the motor to drive the vehicle body.

16. A power storage device equipped with the power supply device according to claim 1, the power storage device further comprising:
a power supply controller configured to control charging to and discharging from the power supply device, wherein the power supply controller allows battery cells to be charged by power from an externally connected device and controls charging to the battery cells.

* * * * *